US012366092B2

(12) United States Patent
Brennan et al.

(10) Patent No.: US 12,366,092 B2
(45) **Date of Patent: *Jul. 22, 2025**

(54) INTERCHANGEABLE LATCH ASSEMBLY FOR AN EXIT DEVICE

(71) Applicant: Hanchett Entry Systems, Inc., Phoenix, AZ (US)

(72) Inventors: John Brennan, Phoenix, AZ (US); Larry Gene Corwin, Jr., Mesa, AZ (US)

(73) Assignee: Hanchett Entry Systems, Inc.

( * ) Notice: Subject to any disclaimer, the term of this patent is extended or adjusted under 35 U.S.C. 154(b) by 214 days.

This patent is subject to a terminal disclaimer.

(21) Appl. No.: 18/155,449

(22) Filed: Jan. 17, 2023

(65) Prior Publication Data

US 2023/0151645 A1 May 18, 2023

Related U.S. Application Data

(63) Continuation of application No. 16/202,802, filed on Nov. 28, 2018, now Pat. No. 11,566,449.

(Continued)

(51) Int. Cl.
*E05B 65/10* (2006.01)
*E05B 15/10* (2006.01)
(Continued)

(52) U.S. Cl.
CPC .......... *E05B 65/1046* (2013.01); *E05B 47/02* (2013.01); *E05B 63/0056* (2013.01);
(Continued)

(58) Field of Classification Search
CPC ......... Y10T 292/1014; Y10T 292/0908; Y10T 292/0909; Y10T 292/091; E05B 65/1046;
(Continued)

(56) References Cited

U.S. PATENT DOCUMENTS 3,730,574 A * 5/1973 Zawadzki ........... E05B 65/1053 70/92
3,767,238 A * 10/1973 Zawadzki ........... E05B 65/1053 292/201

(Continued)

FOREIGN PATENT DOCUMENTS

CA 2832778 5/2014
CA 2832778 A1 * 5/2014 ......... E05B 17/2034

(Continued)

OTHER PUBLICATIONS

Tullia, Steven A, Non-Final Office Action, U.S. Appl. No. 16/202,802, filed Apr. 14, 2021, 20 pages, U.S. Patent & Trademark Office.

(Continued)

*Primary Examiner* — Kristina R Fulton
*Assistant Examiner* — Steven A Tullia
(74) *Attorney, Agent, or Firm* — Woods Oviatt Gilman LLP; Dennis B. Danella, Esq.

(57) ABSTRACT

A door latch system comprises an interchangeable latch assembly for securing a door to a door frame. The interchangeable latch assembly comprises a head and a latch mounted to the head. The latch is moveable between latched and unlatched positions. A driven member is operatively connected to the latch, the driven member moveable to latch or unlatch the latch. The door latch system further comprises a universal actuating assembly removably couple-able to the interchangeable latch assembly. The universal actuating assembly comprises a mounting bracket and a driving member releasably coupled to the driven member. Actuation of the universal actuating assembly translates the driving member and the driven member, moving the latch to the unlatched position. A first interchangeable latch assembly may be swapped with a second interchangeable latch assem- (Continued)

bly without requiring modification of the universal actuating assembly.

7 Claims, 31 Drawing Sheets

Related U.S. Application Data

(60) Provisional application No. 62/591,985, filed on Nov. 29, 2017.

(51) Int. Cl.
*E05B 47/00* (2006.01)
*E05B 47/02* (2006.01)
*E05B 63/00* (2006.01)
*E05C 3/22* (2006.01)
*E05C 9/04* (2006.01)

(52) U.S. Cl.
CPC ...... *E05B 65/1006* (2013.01); *E05B 65/1053* (2013.01); *E05C 3/22* (2013.01); *E05B 15/10* (2013.01); *E05B 47/00* (2013.01); *E05C 9/043* (2013.01)

(58) Field of Classification Search
CPC ............. E05B 65/1006; E05B 65/1053; E05B 65/1093; E05B 47/02; E05B 47/00; E05B 63/0056; E05B 15/10; E05C 3/22; E05C 9/043; Y10S 292/65; Y10S 292/53; Y10S 292/54; Y10S 292/64
See application file for complete search history.

(56) References Cited

U.S. PATENT DOCUMENTS 4,427,223 A * 1/1984 Godec ................ E05B 63/0065 70/478
4,458,928 A 7/1984 Hirschbein
4,741,563 A * 5/1988 Cohrs ................ E05B 65/1046 292/168
4,824,150 A * 4/1989 Smith .................. E05B 65/104 292/279
4,875,722 A * 10/1989 Miller ................ E05B 65/1073 292/201
4,978,151 A * 12/1990 Coleman ............ E05B 65/1046 292/DIG. 65
5,169,185 A * 12/1992 Slaybaugh .......... E05B 65/1053 292/92
5,890,752 A * 4/1999 Lin ...................... E05B 65/104 292/DIG. 65
6,032,985 A * 3/2000 Cutter ................ E05B 65/1046 70/92
6,189,939 B1 * 2/2001 Zehrung ............ E05B 65/1053 70/92
10,017,964 B2 7/2018 Corwin, Jr.
11,566,449 B2 * 1/2023 Brennan ............ E05B 63/0056
2004/0189018 A1 * 9/2004 Geringer ............ E05B 65/1046 292/251.5
2004/0227351 A1 * 11/2004 Lin .................... E05B 65/1006 292/92
2009/0107189 A1 * 4/2009 Lin ...................... E05B 65/106 70/91
2010/0007154 A1 * 1/2010 Schacht ................ E05B 65/104 292/92
2010/0066101 A1 * 3/2010 Shen .................. E05B 65/1006 292/21
2014/0109479 A1 * 4/2014 Morstatt ............ E05B 65/1093 292/144
2015/0167354 A1 * 6/2015 Tien ......................... E05B 9/08 292/92
2016/0002963 A1 * 1/2016 Kondi ................ E05B 65/1046 292/5
2016/0115719 A1 * 4/2016 Coleman ............ E05B 17/2084 292/195
2016/0333621 A1 * 11/2016 Lehner, Jr. .............. E05F 11/54
2017/0081883 A1 * 3/2017 Lin .................... E05B 65/1093

FOREIGN PATENT DOCUMENTS

EP 481931 4/1992
EP 481931 A * 4/1992 ......... E05B 65/1053
WO 9951838 10/1999
WO WO-9951838 A1 * 10/1999 ............ E05B 17/06

OTHER PUBLICATIONS

Tullia, Steven A, Final Office Action, U.S. Appl. No. 16/202,802, filed Aug. 25, 2021, 13 pages, U.S. Patent & Trademark Office.
Tullia, Steven A, Non-Final Office Action, U.S. Appl. No. 16/202,802, filed Jan. 27, 2022, 14 pages, U.S. Patent & Trademark Office.

* cited by examiner

INTERCHANGEABLE LATCH ASSEMBLY FOR AN EXIT DEVICE

RELATIONSHIP TO OTHER APPLICATIONS AND PATENTS

This application is a continuation of U.S. patent application Ser. No. 16/202,802, filed Nov. 28, 2018, now U.S. Pat. No. 11,566,449, which claims the benefit of U.S. Provisional Patent Application No. 62/591,985, filed Nov. 29, 2017, which is hereby incorporated by referenced in its entirety.

TECHNICAL FIELD

The present invention relates to a door latch system for latching a hinged door into a frame; and more particularly, to a door latch system wherein any one of a variety of latch heads may be selectively assembled to a universal actuating assembly as required for a particular application. The door latch system includes a universal actuating assembly and an interchangeable latch assembly, wherein the interchangeable latch assembly is removably coupled to the universal actuating assembly as a unit. The interchangeable latch assembly includes a driven member commonly configured to releasably mount with a driving member of an actuating mechanism of the universal actuating assembly. Interchangeable latch assemblies having any one of a variety of latch heads, such as a Pullman style latch head, a star wheel style latch head, a mortise style latch head or a vertical rod style latch head, may then be readily and interchangeably mounted to the universal actuating assembly without requiring modification of the remainder of the latch system. The door latch system may include other features and accessories making the door latch system readily convertible to various field applications and needs.

BACKGROUND OF THE INVENTION

Existing door latch systems, such as exit devices, incorporate a locking element, such as a latch, engageable with a mating strike. In unlocking, the latch of the exit device is required to rotate or retract out of the way of the mating strike to reach a state of being unlocked. The latch is typically mounted in a door and the strike in a door frame. However, the opposite may exist to equal effect.

Exit devices typically employ a push bar to enable unlocking of the latch system so as to enable door opening. Push bars allow users to open the door without necessarily requiring the use of their hands. Rather, the user's body can be used to push against the push bar until the latch is retracted from the strike. Alternatively or additionally, exit devices may also include an electrically actuable latch such that an electric current is supplied to the latch to withdraw the latch from the strike.

Doors associated with exit devices may be secured in the door frame through numerous possible latching heads such as, for example, a Pullman style latch head, a star wheel style latch head, a vertical rod style latch head or a mortise style latch head. In some cases, where an alternate means is used to secure the door, such as an electromagnetic lock system, a dummy "latch-less" head may be used.

Typically, each of these devices requires an entire, dedicated door latch system to be utilized with that particular style of latch head. As a result, numerous bulky systems must be fabricated and inventoried by a manufacturer or distributor so a desired door latch system is available when requested or needed. Further, special features, such as for example, a dogging feature to lock out the push bar, a push bar position sensor or a built in audible alarm, may be desired adding to the number of systems that must be fabricated and inventoried. In addition, if repair or reconfiguration of the door latch system in the field is required, replacement of the entire door latch system may be necessary.

Thus, what is needed in the art is a simplified door latch system, and especially a simplified door latch system that incorporates a universal actuating assembly configured to engage with one of a number of various interchangeable latch head assemblies such that fabrication and stocking requirements are reduced and ease of repair or reconfiguration is improved.

What is further needed is a door latch system with an assortment of available add-on accessories and features wherein the system is designed to readily incorporate any of the accessories/features, or not, depending on the end use needs of the system.

It is a principal object of the present invention to address these, as well as other, needs.

SUMMARY OF THE INVENTION

Briefly described, an exit device-type door latch system is configured for releasably securing a door in a door frame. The door latch system generally comprises an interchangeable latch assembly, a universal actuating assembly and a housing for receiving the interchangeable latch assembly and universal actuating assembly.

The interchangeable latch assembly comprises a latch head having a latch mounted to the latch head, the latch being selectively moveable between an extended or latched mode wherein the door is secured in the door frame and a retracted or unlatched mode wherein the door is unsecured. The interchangeable latch assembly further comprises a driven member operatively connected to the latch, the driven member moveable to extend or retract the latch.

The universal actuating assembly, removably couple-able with the interchangeable latch assembly, comprises an actuating mechanism. The actuating mechanism includes a mounting bracket, a driving member, at least one actuating member and a push bar operably coupled to the at least one actuating member. The interchangeable latch assembly is removably securable to the mounting bracket of the universal actuating assembly. Actuation of the driving member by depressing the push bar translates the driving member and the connected driven member to move the latch to the retracted position and place the latch assembly in the unlatched mode.

A first interchangeable latch assembly may be swapped with a second interchangeable latch assembly without requiring modification of the universal actuating assembly.

In accordance with an aspect of the present invention, the actuating mechanism comprises at least one actuating member coupled to a push bar, the actuating member including a pivoting leg coupled to the driving member of the actuating mechanism and configured to translate the driving member and the driven member to retract the latch when the push bar is in a depressed position and extend the latch when the push bar is in a released position.

In accordance with a further aspect of the present invention, one or the other of the driven member and the driving member includes a threaded post while the other includes a slot configured to receive the threaded post, and a corresponding threaded fastener is configured to threadably engage the threaded post to couple the driven member to the driving member.

In accordance with another aspect of the present invention, the interchangeable latch assembly is selected from one of the following types: a Pullman style interchangeable latch mechanism, a star wheel style interchangeable latch mechanism, a surface vertical rod style interchangeable latch mechanism, a concealed vertical rod style interchangeable latch mechanism or a mortise style interchangeable latch mechanism.

In accordance with another aspect of the invention, the interchangeable latch assembly may include a dummy head.

In accordance with the invention, to assure compatibility between a universal actuating assembly and a selected interchangeable latch assembly, x-y-z coordinates measured between: (a) an arbitrary mounting point commonly shared by the universal actuating assembly and the selected interchangeable latch assembly when the interchangeable latch assembly is secured to the universal actuating assembly and (b) a connector point of the driving member and a connector point of the driven member when the latch is in its latched position are generally equal so that connector points, when the interchangeable latch assembly and the universal actuating assembly are connected, share the same point in space.

In accordance with another aspect of the invention, a method of swapping a first interchangeable latch assembly with a second interchangeable latch assembly without requiring modification of the universal actuating assembly of a door latch system is provided including the steps of:

(1) providing door latch system having a universal actuating assembly and a first interchangeable latch assembly, wherein the x-y-z coordinates measured between an arbitrary mounting point commonly shared by the universal actuating assembly and the first interchangeable latch assembly when the first interchangeable latch assembly is secured to universal actuating assembly, and a connector point of the driving member and a connector point of driven member when the latch is in its latched position are generally equal; (2) disconnecting and removing the first interchangeable latch assembly; (3) selecting a second interchangeable latch assembly wherein the x-y-z coordinates measured between an arbitrary mounting point commonly shared by the first universal actuating assembly and the selected second interchangeable latch assembly when the second interchangeable latch assembly is secured to the universal actuating assembly, and a connector point of the driving member and a connector point of the driven member when the latch is in its latched position are generally equal; and (4) connecting the second interchangeable latch assembly to the universal actuating assembly.

In a further aspect of the invention, following step (1), further steps may include: removing the end cap and removing the push bar. Following step (4), further steps may include: reconnecting the push bar and reinstalling the end cap.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
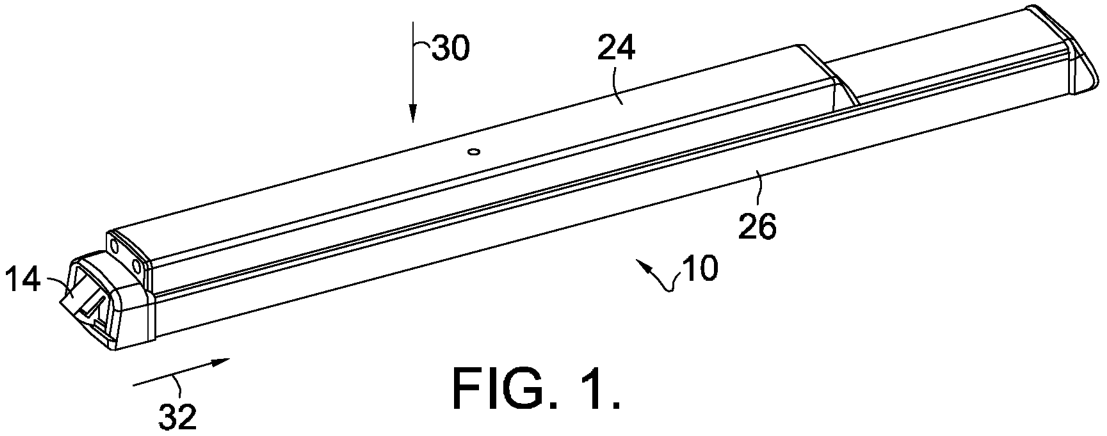
FIG. 1 is a perspective view of a door latch system incorporating an embodiment in accordance with the present invention.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Referring to FIGS. 1-3 and 3A, door latch system 10 in accordance with the invention may include universal actuating assembly 11 and exemplary interchangeable latch assembly 12. Door latch system 10 may be mounted on a door 18 while a mating strike may be mounted on a door frame 22. See e.g., FIG. 4D.

To assure compatibility between a universal actuating assembly and a selected interchangeable latch assembly, an important aspect of the invention is that, when a selected interchangeable latch assembly is connected to an associated universal actuating assembly, regardless of: (1) the type of actuator (e.g., linear movement as described in detail below, rotational movement, arcuate movement, etc.); (2) the type of latch head (e.g., Pullman style, star wheel style, vertical rod style, mortise style, etc.); (3) how the interchangeable latch assembly connects to the universal actuating assembly (e.g., pin and slot, fastener, by mating surfaces contact, etc.); or (4) whether the latch head is being exchanged for an identical latch head or for a different type of latch head or whether the universal actuating assembly is being replaced, the interchangeable latch assembly matches up with the universal actuating assembly when the two are connected so that retraction of the latch from the associated strike is accomplished when the push bar is depressed.

For purposes of describing the general aspects of the invention, the device as described in FIGS. 1-3A include a Pullman style latch head interchangeable latch assembly 12 mated to a universal actuating assembly 11 with a linear-movement actuator. However, it is understood that the invention comprehends any types of movements or latches available in the art.

Referring further to FIGS. 1-3 and 3A, universal actuating assembly 11 includes actuating mechanism 16 which is mounted to housing 26 (a linear-movement actuating mechanism is shown). Housing 26 has a U-shaped cross section. Actuating mechanism 16 may include mounting bracket 40, a driving member 46, such as an actuating bar, movably connected to mounting bracket 40, at least one actuating member 34 and push bar 24. Actuating mechanism 16 may be actuable by push bar 24 secured within housing 26 which is mounted on door 18. An end cap 28 may be secured to housing 26 to cover any exposed internal components and present an aesthetically pleasing lock system. Depression of push bar 24 into housing 26, such as in an actuating direction 30, operates to move latch 14 of an exemplary interchangeable latch assembly 12 in an unlocking direction 32 which is generally orthogonal to actuating direction 30. Such movement causes exemplary latch 14 to disengage from corresponding strike 20 which is secured in door frame 22 (FIG. 4D).

To facilitate depression of push bar 24 so as to direct exemplary latch 14 from the latched position to the unlatched position, push bar 24 may be coupled to at least one actuating member 34 by way of respective bar mounts 36 situated on each actuating member 34. Each actuating member 34 may include a fixed leg 38 secured to mounting bracket 40 at a first end 38*a* and to a pivoting leg 42 at the opposing second end 38*b* via a pivot pin 44. Pivoting leg 42 may be pivotally coupled to bar mount 36 at a first end 42*a* and to driving member 46 at a second end 42*b*, wherein driving member 46 may be slidably coupled to mounting bracket 40 for linear movement. Mounting bracket 40 may be fixedly secured to door 18 such that movement of push bar 24 in the actuating direction 30 through manual depression of push bar 24 pivots pivoting leg 42 about pivot pin 44 thereby causing driving member 46 to translate in the unlocking direction 32 and thereby causing latch 14 to withdraw from strike 20. Each actuating member 34 may further include a biasing member 48 (see for example FIG. 19C) which may operate to urge driving member 46 in a locking direction 50 to reverse pivot actuating member 34 and return push bar 24 to the extended position shown in FIG. 1 whereby latch 14 is placed in the latched position so as to engage strike 20 and secure door 18 in door frame 22.

Bar mounts 36 may include opposing flanges 52 which are configured to slidably engage with a mating set of tracks 54 located along the inner surface 56 of push bar 24. See e.g., FIG. 17A. Opposing push bar ends 58, 60 are constrained within housing 26 so as to prevent lateral movement of push bar 24 during operation. In this manner, push bar 24 floats within housing 26 and is able to cycle between extended and depressed positions through sliding travel of flanges 52 within the mating set of tracks 54 on push bar 24. Push bar 24 may also be selectively secured in the depressed position by way of a dogging mechanism 62 which will be discussed in greater detail below. Door latch system 10 may also include one or more bar guides 64 which will be discussed in greater detail below with regard to FIGS. 17A and 17B.

Figure 2:
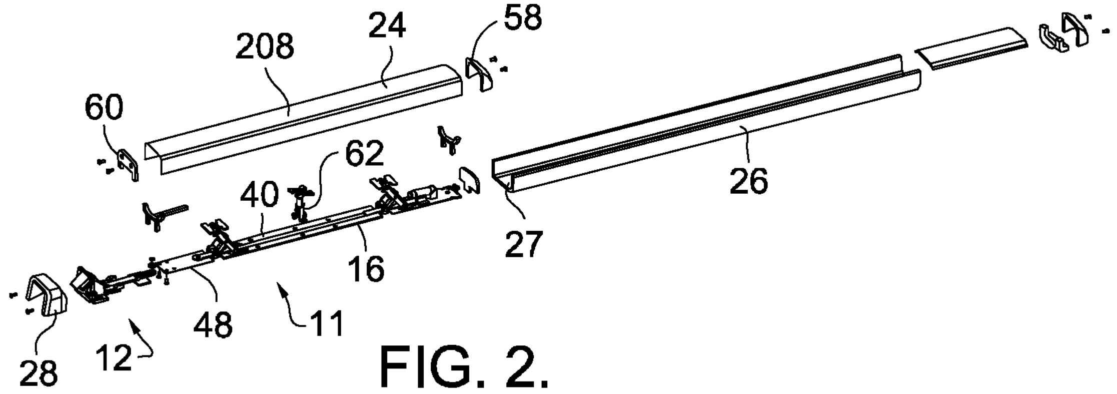
FIG. 2 is an exploded view of the latch system shown in FIG. 1.
Figure 3:
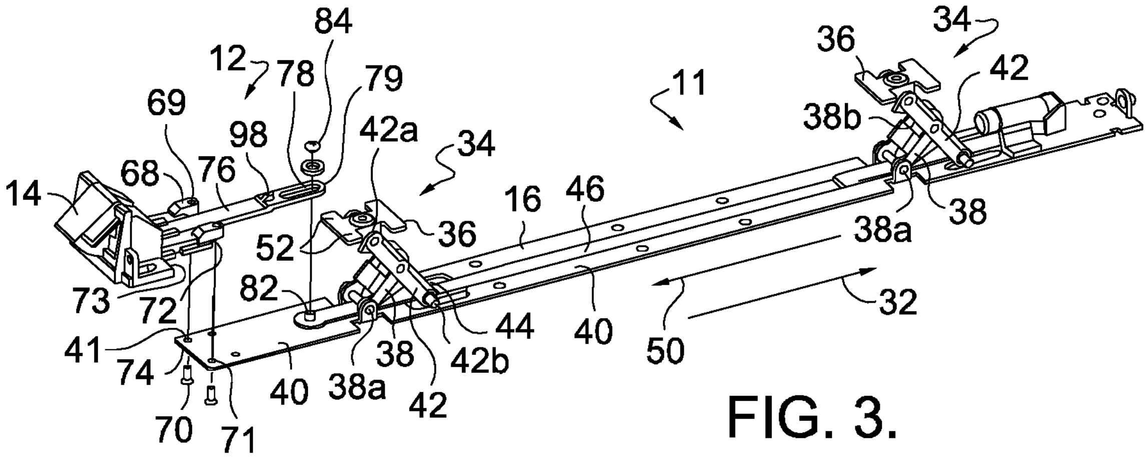
FIG. 3 is detailed view of components of a universal actuating assembly and an interchangeable latch assembly in accordance with the present invention.
Figure 3A:
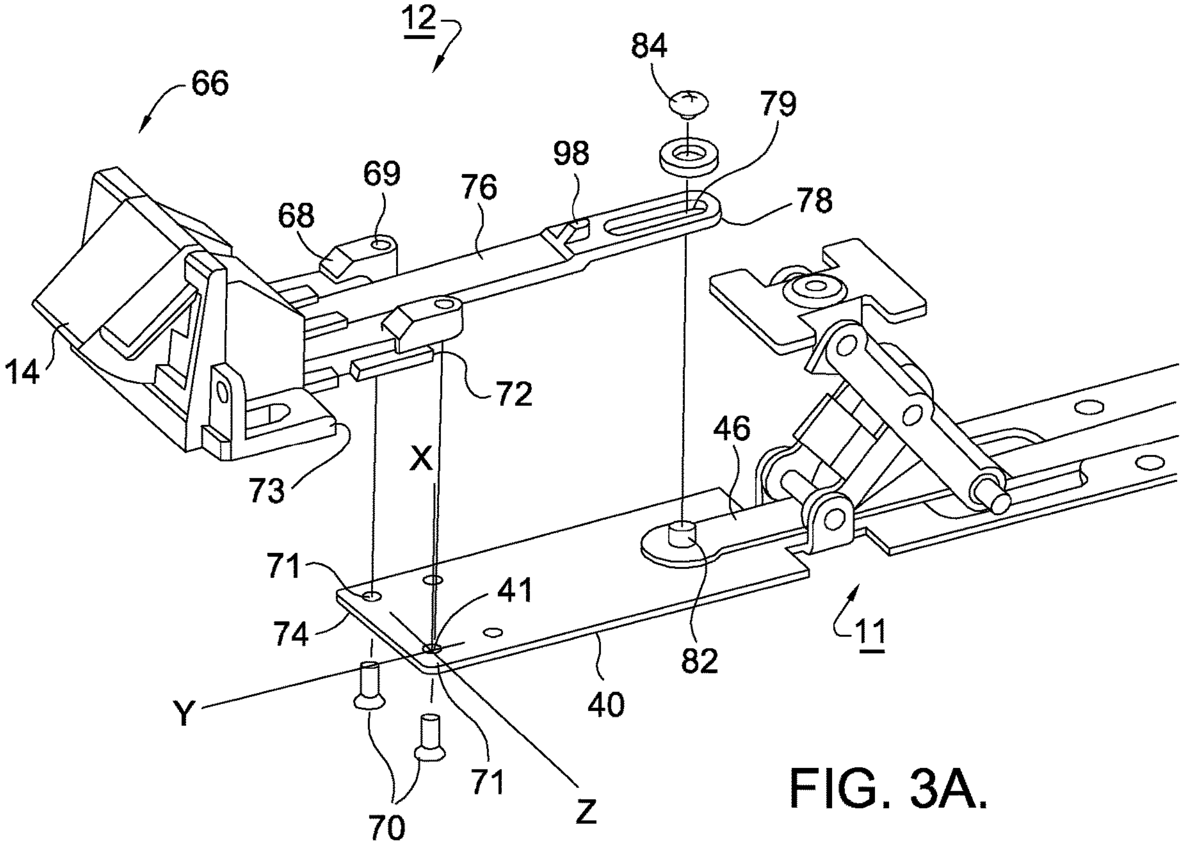
FIG. 3A is a magnified view of the interchangeable latch assembly end of FIG. 3, in accordance with the invention.
Figure 4A:
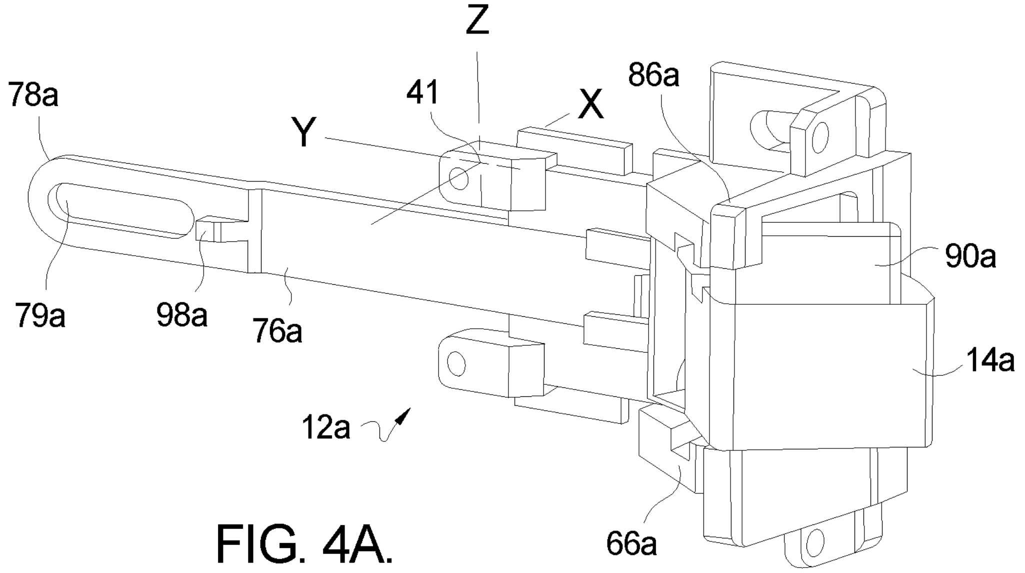
FIG. 4A is a perspective view of a Pullman style interchangeable latch assembly in accordance with the invention.
Figure 4B:
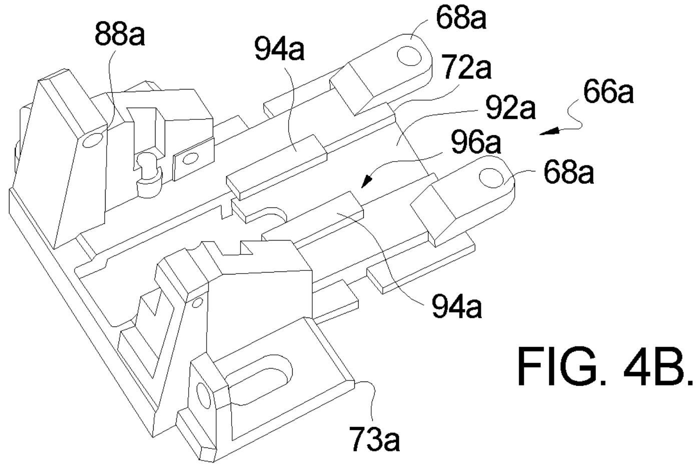
FIG. 4B is a perspective view of a latch head used with the Pullman style interchangeable latch assembly shown in FIG. 4A.
Figure 4C:
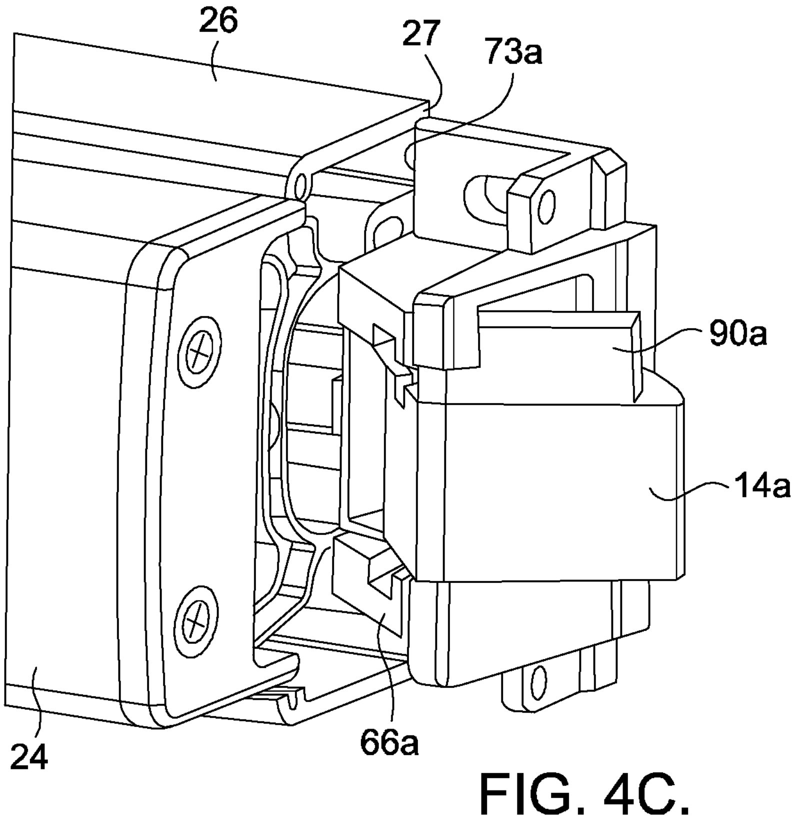
FIG. 4C is a perspective view of the Pullman style interchangeable latch assembly shown in FIG. 4A mounted within the door latch system shown in FIG. 1.
Figure 4D:
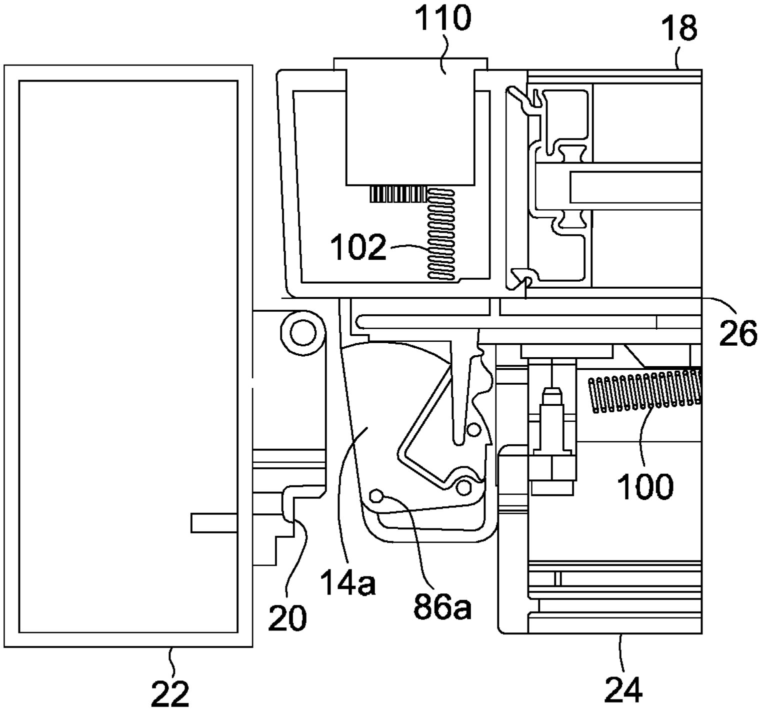
FIG. 4D is a cross section view of the Pullman style interchangeable latch assembly shown in FIG. 4C mounted onto a door and in engagement with a strike.
Figure 4E:
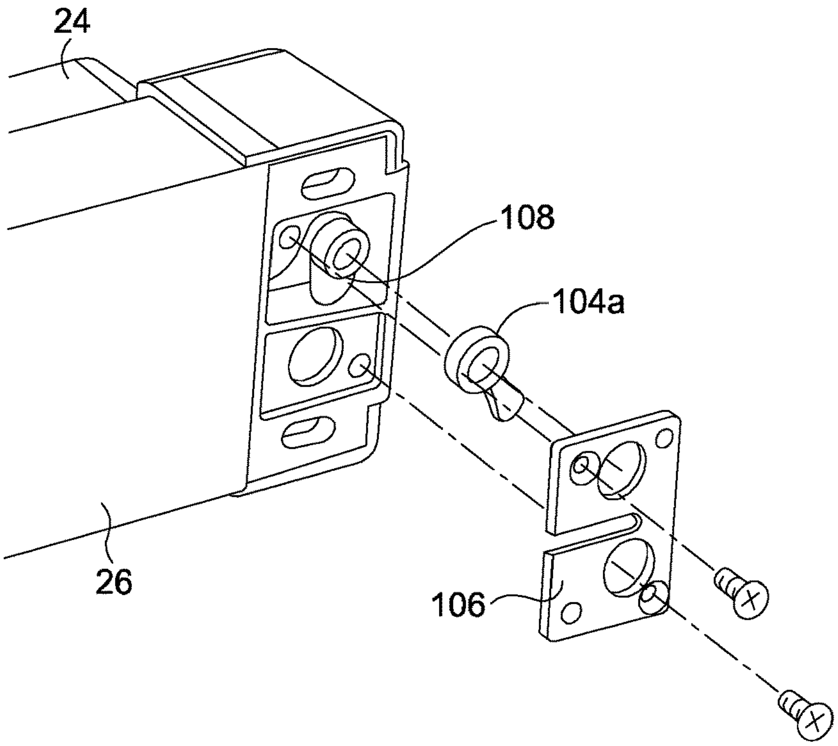
FIG. 4E is an exploded view of an end of a Pullman style door latch system configured for left-handed operation.
Figure 4F:
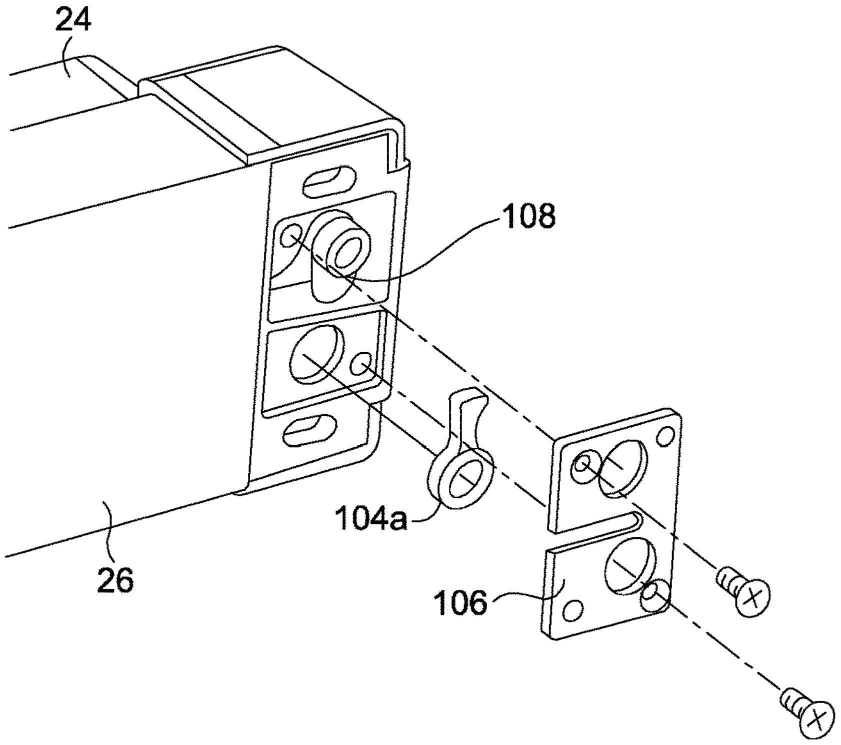
FIG. 4F is an exploded view of an end of a Pullman style door latch system configured for right-handed operation.

With continued reference to FIGS. 2, 3 and 3A, regardless of the type of latch head or actuator mechanism used with the door latch system, exemplary interchangeable latch assembly 12 (shown in FIGS. 1-3A as having a Pullman style latch head 66), generally comprises latch head 66 and driven member 76 (shown as a linearly moving driven member). Driven member 76 is operatively connected at one end (not shown) to latch 14 of latch head 66 and, at the opposite end 78, connectable to a universal actuating assembly as described above. Noting the interchangeability of the design, when an interchangeable latch assembly is connected to the universal actuating assembly, regardless of the latch type, retraction of the latch from the associated strike is accomplished when the push bar is depressed.

Latch head 66 may include one or more lobes 68 which are adapted to be releasably secured to mounting bracket 40 via one or more head fasteners 70 through mounting holes 69. Latch head 66 may further include a recessed ledge 72 configured to engage a forward edge 74 of mounting bracket 40 when head fasteners 70 are inserted through holes 71 in mounting bracket 40 and are secured within holes 69 of lobes 68. Latch head 66 may further include a housing edge 73 configured to engage with housing end wall 27 (see FIG. 2). The engagement of ledge 72 with edge 74, as well as the engagement of housing edge 73 with housing end wall 27, may operate to prevent or inhibit rotational/torsional displacement of exemplary latch head 66 in relation to strike 20 during the repeated use of door latch system 10.

To assure compatibility between a universal actuating assembly and a selected interchangeable latch assembly, the three dimensional coordinates that locate the attaching features of the respective assemblies from a common mounting must be the same. Referring to FIG. 3A, the x-y-z coordinates measured between: (a) an arbitrary mounting point 41, commonly shared by the universal actuating assembly and the selected interchangeable latch assembly when interchangeable latch assembly 12 is secured to universal actuating assembly 11, and (b) connector point 82 of driving member 46 (i.e., first spatial relationship) and connector point 79 of driven member 76 (i.e., second spatial relationship) are generally equal when the latch is in its latched position. As a result, connector points 79 and 82, when the interchangeable latch assembly and the universal actuating assembly are connected, share the same point in space. In the example shown in FIG. 3A, connector point 82 (shown as a post) and connector point 79 (shown as an end of a slot) share the same x-y-z coordinate position relative to common mounting point 41 when the assemblies are connected.

To make connection with universal actuating assembly 11, and by way of example and by no means to be limited specifically thereto, connector point 79 of driven member 76, located within slot 80, may be configured to coincide with a corresponding connector point 82 of driving member 46, shown as a post, wherein fastener 84 is removably coupled to connector point 82 to releasably secure driven member 76 to driving member 46. In this manner, exemplary latch head 66 remains in a fixed position relative to mounting bracket 40 via head fasteners 70 while driven member 76 is coupled to driving member 46 via fastener 84. As a result, once a particular interchangeable latch assembly 12 is connected to universal actuating assembly 11, actuation of actuating members 34 by depressing push bar 24 may drive the coupled driving member 46 and driven member 76 in unlocking direction 32 thereby causing latch 14 to move from its extended position to its retracted position so that latch 14 is freed from strike 20 and door 18 is able to be opened. It should be noted that, while shown as a post-in-slot coupling, any suitable releasable coupling may be used, such as but not limited to clips, snaps and the like. It is also contemplated that the connector points may be coupled to each other by surface contact.

Figure 17A:
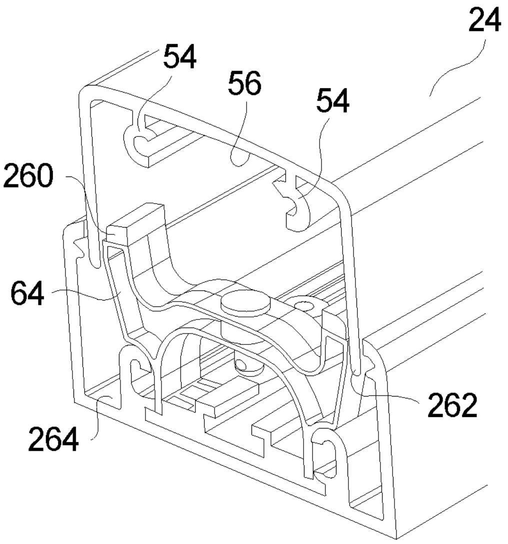

Driven member 76 may further include a tongue 98. Tongue 98 may be configured to engage one end of a biasing member (not shown in FIG. 3 but shown as feature 100 in FIG. 4D) while the opposing end of the biasing member is secured to a component fixed to housing 26, such as for example, the bar guide 64 as shown in FIG. 17A, such that driven member 76 is biased to place latch 14 in its extended position when exemplary interchangeable latch assembly 12 is in its locking orientation.

In accordance with the above description, one aspect of the present invention is to provide a door latch system configured to accommodate one of a number of interchangeable latch assemblies without requiring modification of the remainder of the door latch system. In this manner, latch assembly manufacturing and inventorying efficiencies may be improved as a single universal actuating assembly 11 may be fabricated and any desired/required interchangeable latch assembly may be connected to the universal actuating assembly 11. Accordingly, door latch system 10 for releasably securing a door 18 to a door frame 22 is provided wherein door latch system 10 includes a first interchangeable latch assembly, having a first latch, such as latch 14, and a first driven member, such as driven member 76. Movement of the first driven member moves the first latch between a latched position to secure the door to the door frame and an unlatched position to release the door from the door frame. Door latch system 10 also includes a universal actuating assembly 12. The universal actuating assembly includes driving member 46 wherein driving member 46 is movable between a first driving member position and a second driving member position by depression of push bar 24. When driving member 46 is operatively connected to the first driven member as described above, movement of driving member 46 between its first driving member position and its second driving member position moves the first latch between its latched position and its unlatched position.

To facilitate readily swapping the first latch assembly with a second latch assembly without requiring modification of the remainder of the door latch system, door latch system 10 is configured so that when driving member 46 is connected to a driven member of a second interchangeable latch assembly, movement of the second driven member by driving member 46 moves said latch of the second latch assembly between a latched position to secure said door to said door frame and an unlatched position to release said door from said door frame.

It should be noted that universal actuating assembly 11 (and associated push bar 24 and housing 26) may be fabricated in various standard or custom lengths so as to accommodate doors of varying widths.

By way of the following examples, various latch head styles of an interchangeable latch assembly 12 may be designed to fit with an exemplar linear-movement type universal actuating assembly 11.

Pullman Style Interchangeable Latch Assembly

As best seen in FIGS. 4A through 4D, door latch system 10 may be configured having a Pullman style interchangeable latch assembly 12*a* having a latch mechanism similar to that shown and described within commonly owned U.S. Pat. No. 10,017,964, the entirety of which is incorporated herein by reference. Pullman style interchangeable latch assembly 12*a* generally comprises a latch head 66*a* with latch 14*a* pivotally connected thereto by a pivot pin 86*a* situated within a pivot hole 88*a* on latch head 66*a*. Pullman style interchangeable latch assembly 12*a* may also include a deadlatch 90*a* coupled to latch 14*a* wherein deadlatch 90*a* is operable to prevent unwanted pivoting of latch 14*a* when latch 14*a* resides within strike 20. Driven member 76*a* may be slidably constrained within a groove 92*a* defined in latch head 66*a* such that driven member 76*a* may reciprocally slide in unlocking/locking directions 32/50 as described above. Latch head 66*a* may also include one or more groove plates 94*a* that completely or partially overlap groove 92*a* so as to define channels 96*a* which may minimize or prevent any movement of driven member 76*a* other than in unlocking and locking directions 32/50.

Driven member 76*a* may further include connector point 79*a* defined by second end 78*a* of the driven member. Latch head 66*a* may also include one or more lobes 68*a* which are adapted to be releasably secured to the mounting bracket (not shown) via one or more head fasteners. To assure compatibility between a universal actuating assembly and the selected Pullman style interchangeable latch assembly, and in general reference to FIGS. 3A and 4A, the x-y-z coordinates measured between: (a) an arbitrary mounting point 41 commonly shared by the universal actuating assembly and the selected Pullman style interchangeable latch assembly when interchangeable latch assembly 12*a* is secured to universal actuating assembly 11, and (b) the connector point of the driving member (not shown) and connector point 79*a* of driven member 76*a* when the latch is in its latched position are generally equal so that the two associated connector points, when the assemblies are connected, may share the same point in space.

Latch head 66*a* may further include a recessed ledge 72*a* configured to engage a forward edge 74 of mounting bracket 40 when head fasteners 70 are secured within lobes 68*a* as described above (see FIG. 3A). Latch head 66*a* may further include a housing edge 73*a* configured to engage with housing end wall 27 (see FIG. 4C). Driven member 76*a* may further include a tongue 98*a*. Tongue 98*a* may be configured to engage one end of a biasing member 100 while the opposing end of the biasing member is secured to a component fixed to housing 26, such as for example, bar guide 64 as shown in FIG. 17A, such that driven member 76*a* is biased to place latch 14*a* in its extended position when Pullman style interchangeable latch assembly 12*a* is in its default locking orientation.

Star Wheel Style Interchangeable Latch Assembly

Turning now to FIGS. 5A through 5D, another latch configuration may be adapted to universal actuating assembly 11. Door latch system 10 may be configured having a star wheel style interchangeable latch assembly 12*b*, having a latch mechanism similar to that disclosed within commonly owned U.S. Pat. No. 4,458,928, the entirety of which is herein incorporated by reference. Star wheel style interchangeable latch assembly 12*b* generally comprises a latch head 66*b*, having features similar to latch head 66*a*, with latch 14*b* rotationally connected therein by spindle 86*b* situated within a spindle hole 88*b* defined within latch head 66*b*. Driven member 76*b* may be slidably constrained within a groove 92*b* defined in latch head 66*b* such that driven member 76*b* may reciprocally slide in unlocking direction 32/locking direction 50 as described above. Latch head 66*b* may also include groove plate 94*b* that completely or partially overlap groove 92*b* so as to minimize or prevent any movement of driven member 76*b* other than in unlocking direction 32 and the opposing locking direction 50.

Driven member 76*b* may further include connector point 79*b* defined by second end 78*b* of the driven member. Latch head 66*b* may also include one or more lobes 68*b* which are adapted to be releasably secured to the mounting bracket (not shown) via one or more head fasteners. To assure compatibility between universal actuating assembly 11 and the selected star wheel style interchangeable latch assembly, and in general reference to FIGS. 3A and 4A, the x-y-z coordinates measured between: (a) an arbitrary mounting point 41 commonly shared by the universal actuating assembly and the selected star wheel style interchangeable latch assembly when interchangeable latch assembly 12*b* is secured to universal actuating assembly 11, and (b) the connector point of the driving member (not shown) and connector point 79*b* of driven member 76*b* when the latch is in its latched position are generally equal so that the two associated connector points, when the assemblies are connected, may share the same point in space.

Latch head 66*b* may further include a recessed ledge 72*b* configured to engage a forward edge 74 of mounting bracket 40 when head fasteners 70 are secured within lobes 68*b* as described above. Latch head 66*b* may further include a housing edge 73*b* configured to engage with housing end wall 27 (see FIG. 5C). Driven member 76*b* may further include a tongue 98*b* configured to engage one end of a biasing member 100 while the opposing end of the biasing member is secured to a component fixed to housing 26 such that driven member 76*b* is biased to place latch 14*b* in its latching position when star wheel style latch mechanism 12*b* is in its default locking orientation.

Dummy Head Used with an Electromagnetic Latch

Figure 6A:
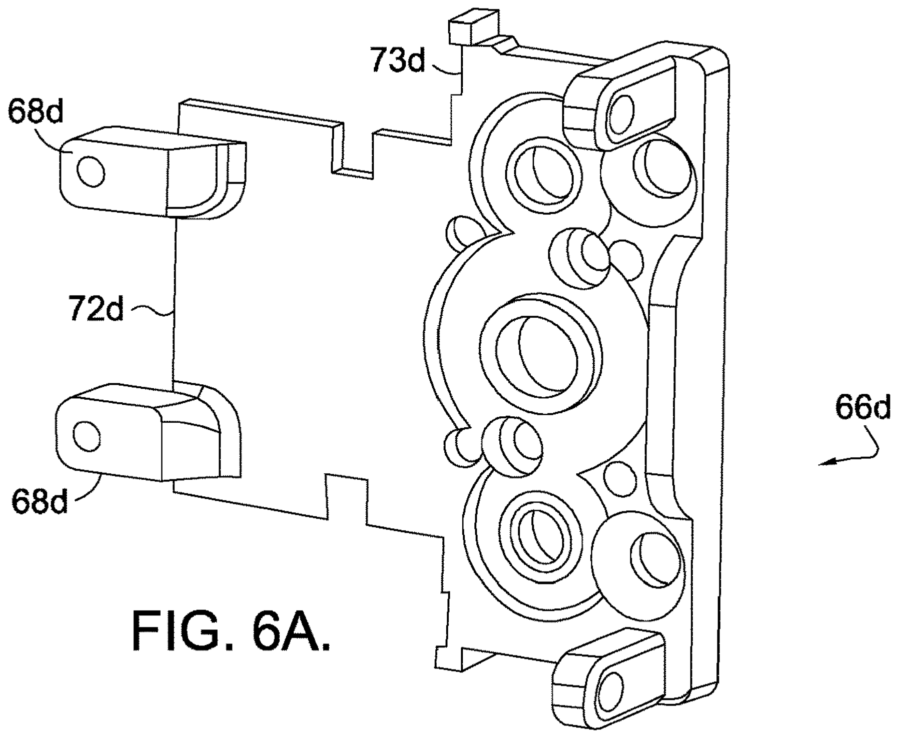
FIG. 6A is a perspective view of an interchangeable dummy head in accordance with the invention.
Figure 6B:
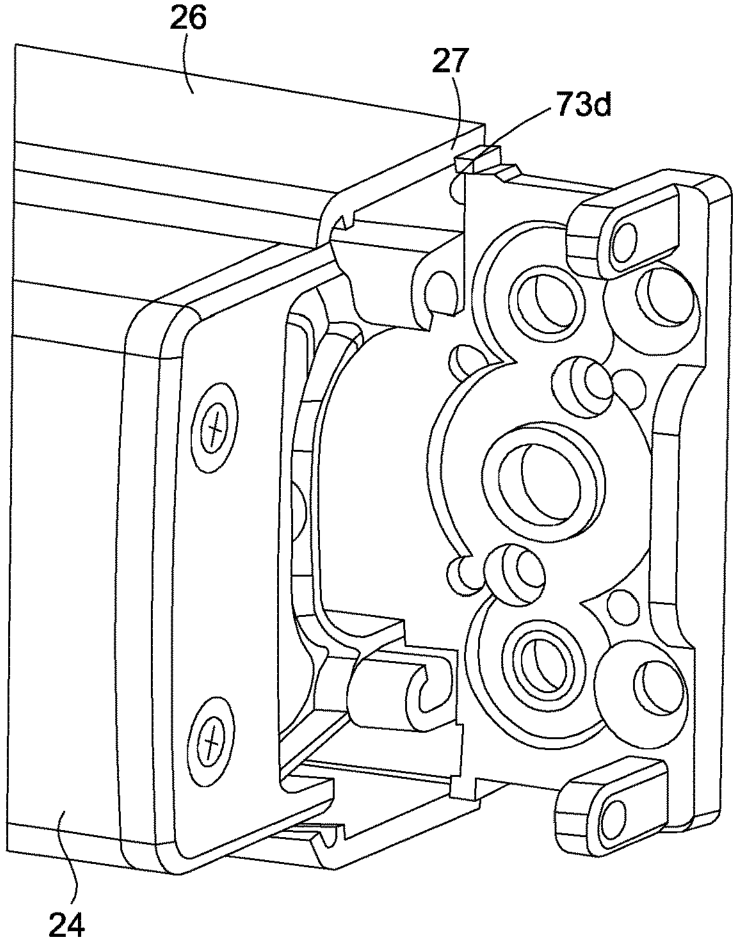
FIG. 6B is a perspective view of the dummy head shown in FIG. 6A mounted within the door latch system shown in FIG. 1.

In reference to FIGS. 6A and 6B, door latch system 10 may be configured with a dummy head 66*d* which need not be mechanically connected to a latch by way of a driven member. For example, dummy head 66*d* may be used in conjunction with an electrified locking system which incorporates an electromagnetic lock system (not shown) to secure a door in a doorframe rather than a latch such as latch 14*a* and 14*b*. In this type of system, depression of the push bar may operate to sever electrical power to the electromagnet thereby unlocking the door. To that end, dummy head 66*d* may include one or more lobes 68*d* which are adapted to be releasably secured to a mounting bracket via one or more head fasteners through mounting holes in the mounting bracket as described above. Dummy head 66*d* may further include a recessed ledge 72*d* configured to engage a forward edge of mounting bracket when the head fasteners are secured within lobes 68*d* as described above. Dummy head 66*d* may further include a housing edge 73*d* configured to engage with housing end wall 27 (see FIG. 6B).

In a door latch system described above, and in reference to FIGS. 6C-6F and FIG. 7, there may be a need to disable push bar 24 in either its extended position (FIG. 6C) or its depressed position (FIG. 6E), using one or more lock out brackets 126 (FIG. 7). Each lock out bracket 126 may include one or more lobes 128, each lobe defining a mounting hole 130. Lobes 128 may be positioned along the length of bar portion 127 so as to define first end 132 and second end 134. Ends 132, 134 may be of differing lengths extending from lobes 128. Mounting holes 130 may be configured to align with respective pre-formed receiving holes on housing 26 such that lock out bracket 126 is secured to housing 26, such as through a threaded screw fastener.

Figure 6C:
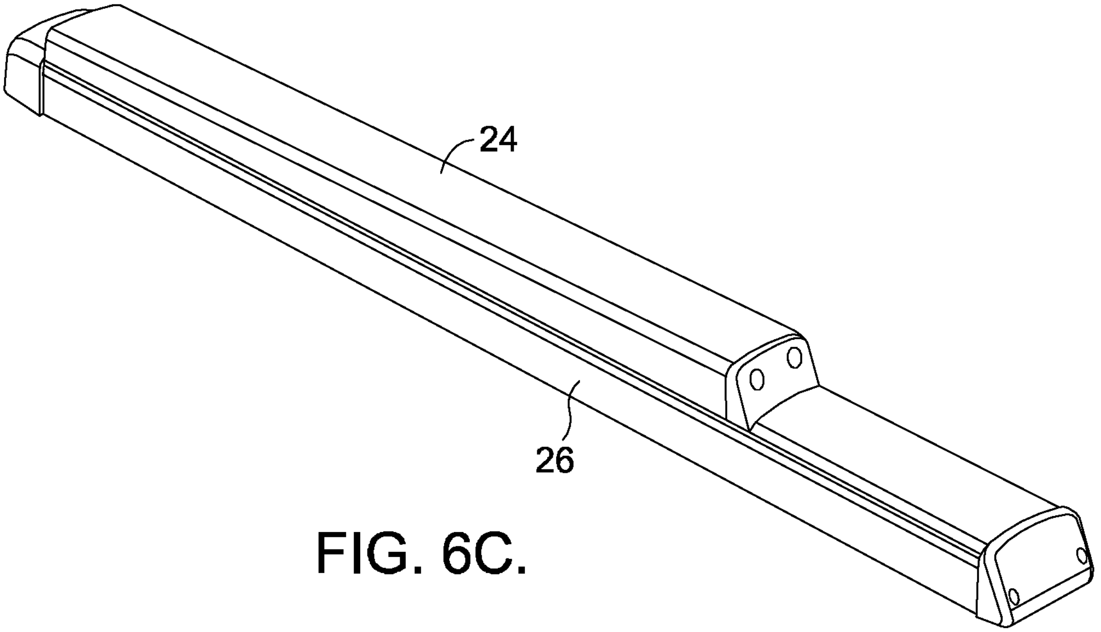
FIGS. 6C and 6D are views of an embodiment of the door latch system shown in FIG. 1 wherein in the push bar is disabled in its extended position.
Figure 6D:
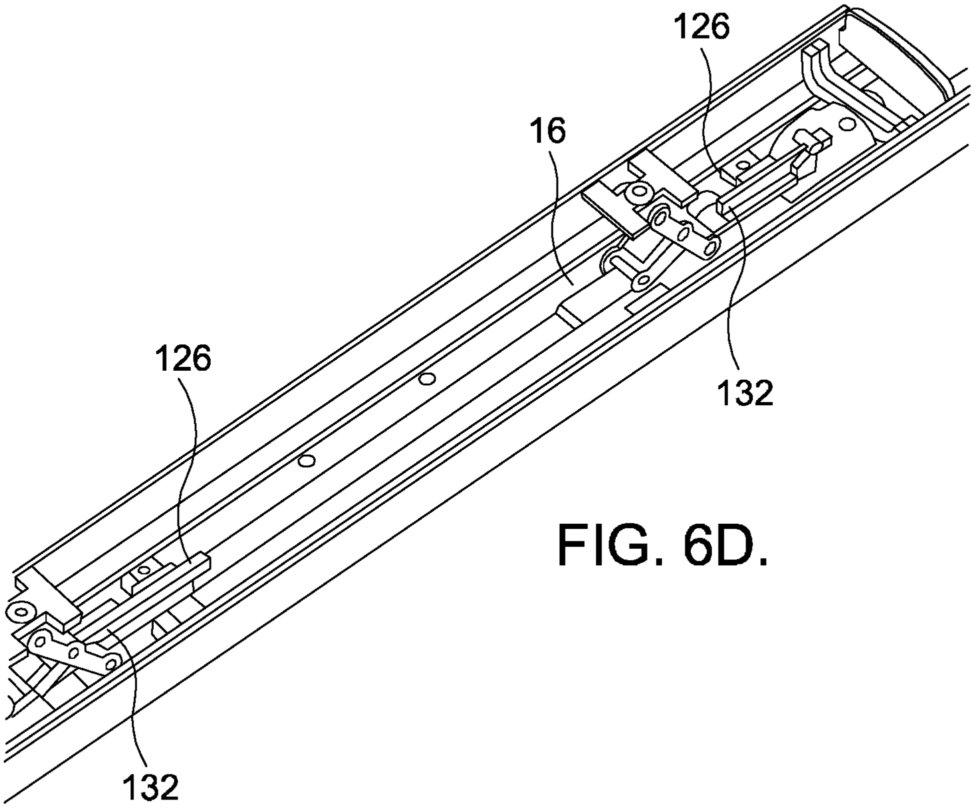
Figure 6E:
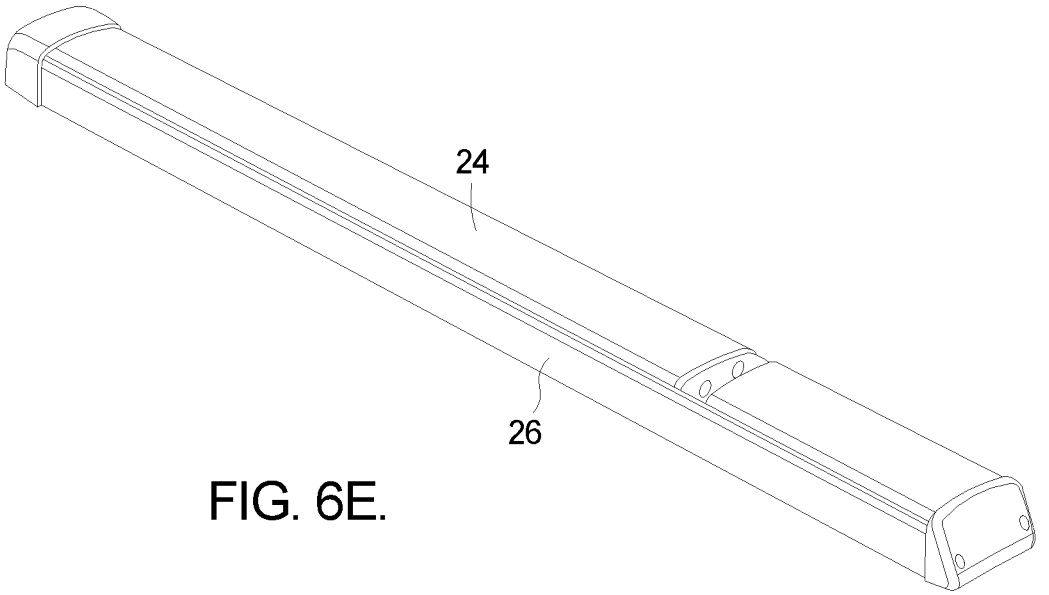
FIGS. 6E and 6F are views of an embodiment of the latch system shown in FIG. 1 wherein in the push bar is disabled in its retracted position.
Figure 6F:
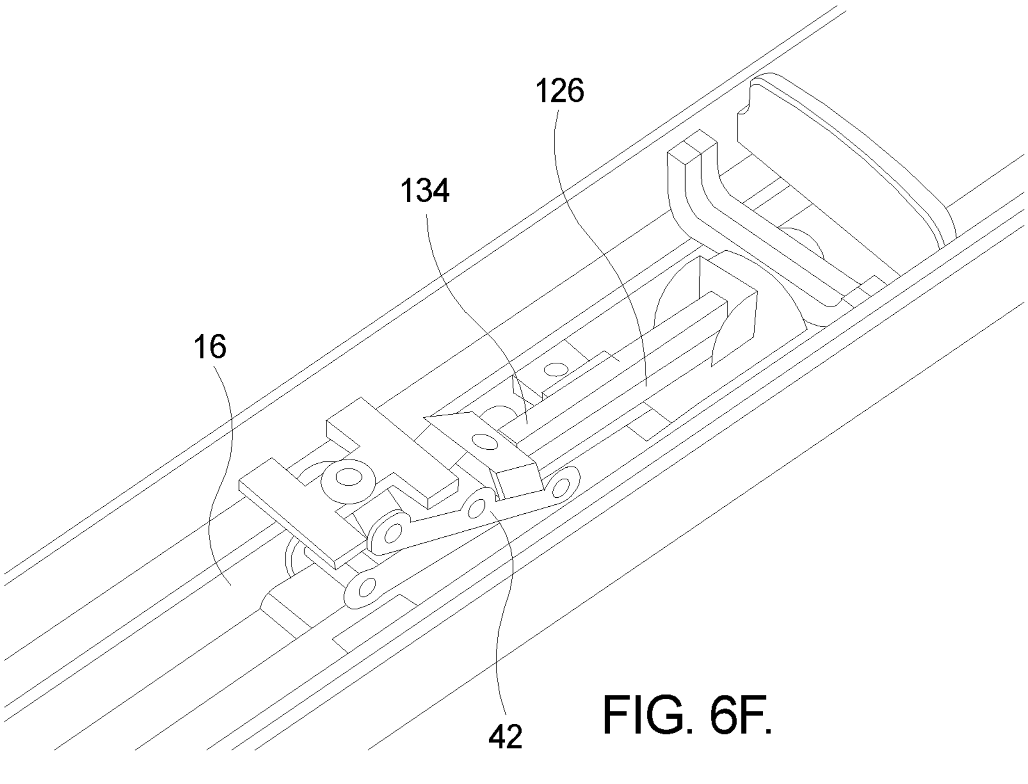
Figure 7:
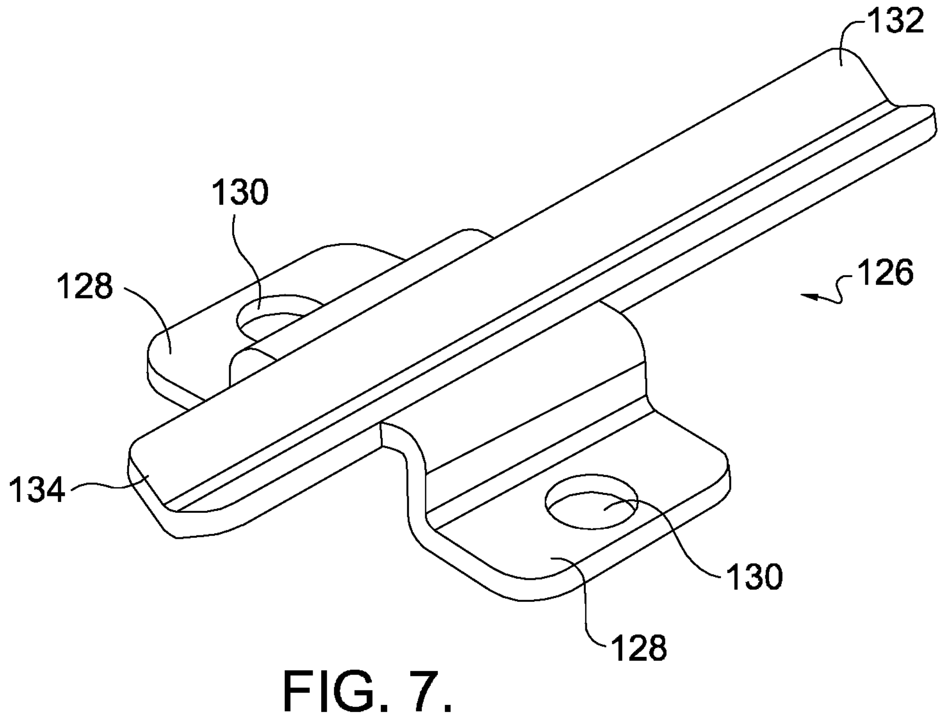
FIG. 7 is a perspective view of a lock out bracket that may be used in conjunction with disabling of the push bar shown in FIGS. 6C and 6E.

As shown in FIGS. 6C and 6D, push bar 24 may be secured in the extended position by securing bracket 126 to housing 26 so that first end 132 is adjacent to actuating mechanism 16 thereby preventing pivoting of pivoting leg 42 as described above. As a result, actuating mechanism 16, and therefore push bar 24, are maintained in the extended position. To accommodate stress or other forces placed upon push bar 24, two or more lock out brackets 126 may be secured within housing 26. Alternatively, as shown in FIGS. 6E and 6F, if push bar 24 is secured in the retracted position, lock out bracket 126 may be oriented such that second end 134 lies adjacent to or abuts actuating mechanism 16 after pivoting of pivoting leg 42. Because push bar 24 is situated within housing 26 in its depressed orientation, a single lock out bracket 126 may be used in this alternative without compromising the structural integrity or security of the door or locking system.

Adaptation of a Dummy Head with Other Mechanical Latches

Figure 9A:
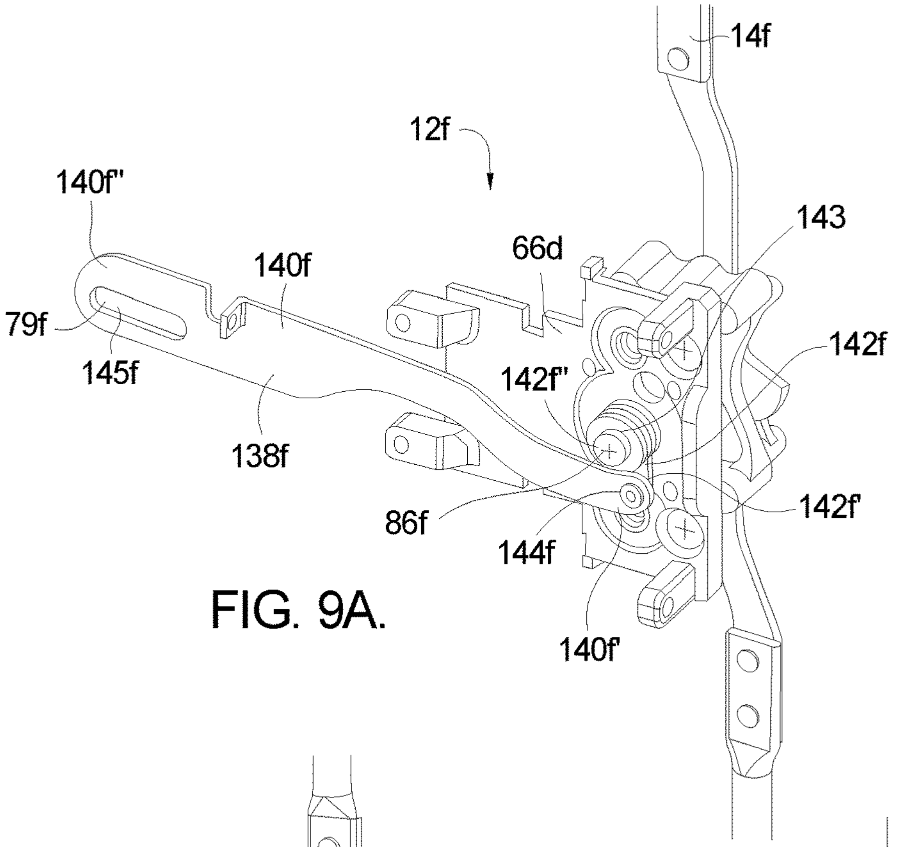
FIGS. 9A through 9C are perspective views of a concealed vertical rod style interchangeable latch assembly.
Figure 9B:
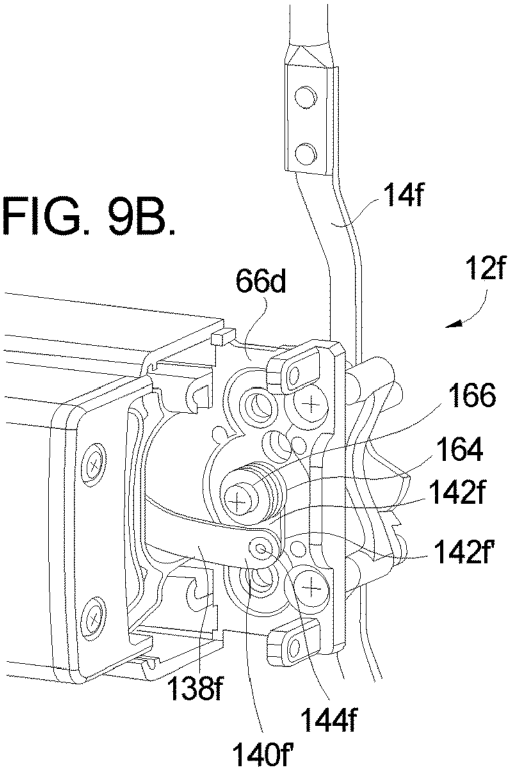
Figure 9C:
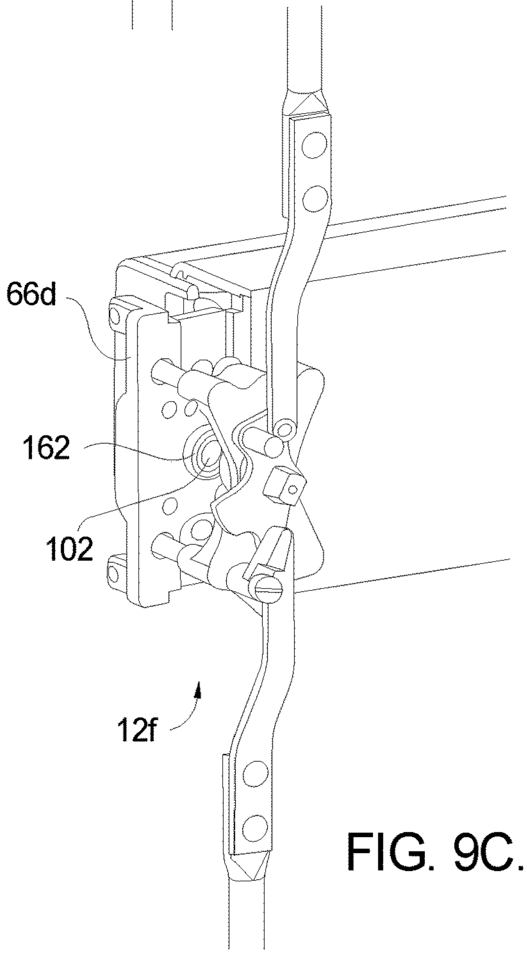
Figure 10A:
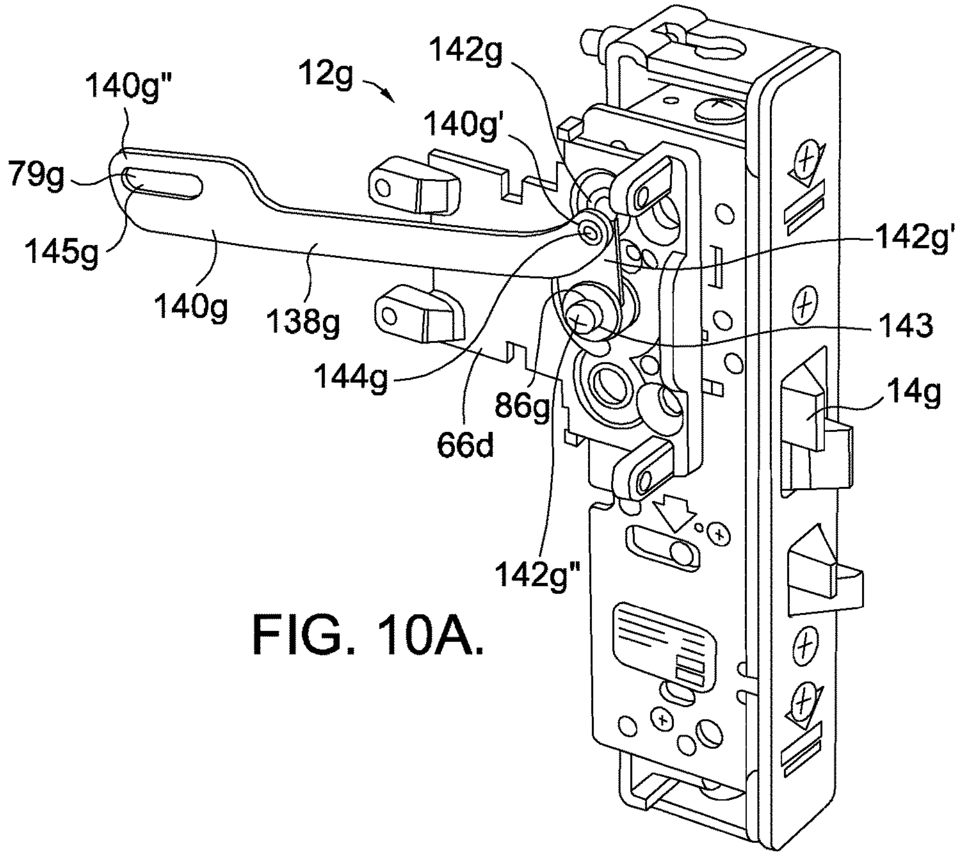
FIGS. 10A through 10C are perspective views of a mortise style interchangeable latch assembly.
Figure 10B:
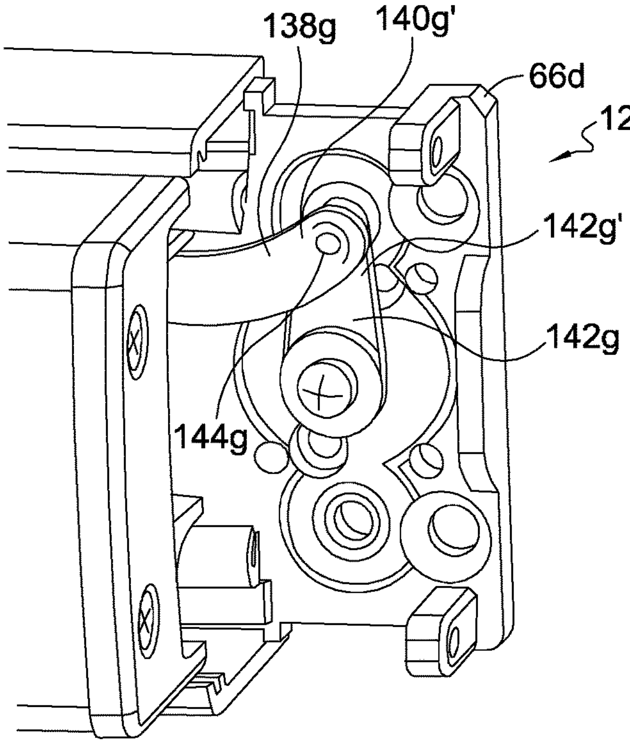
Figure 10C:
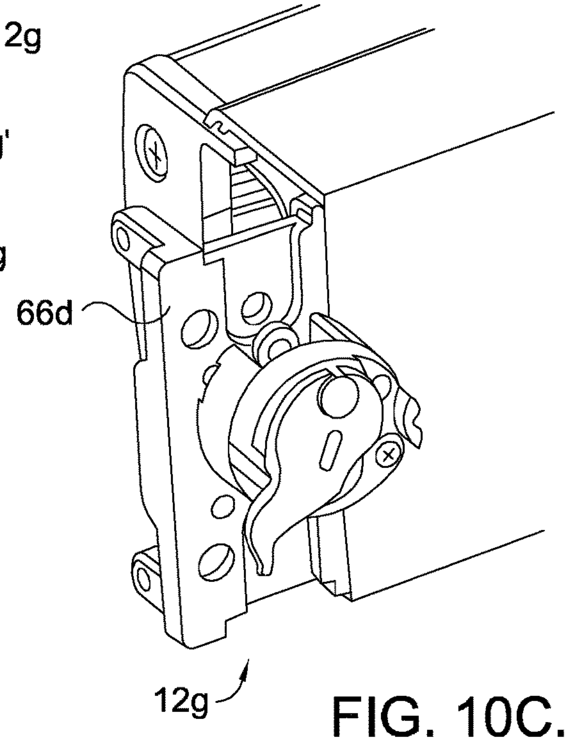

By incorporating features for adaptation to other style latches, dummy head 66*d* as shown in FIG. 6A may also be used as a base to form a number of alternative interchangeable latch assemblies, such as for example, a surface vertical rod (SVR) style interchangeable latch assembly 12*e* (FIG. 8A), a concealed vertical rod (CVR) style interchangeable latch assembly 12*f* (FIG. 9A), or a mortise style interchangeable latch assembly 12*g* (FIG. 10A). Each respective interchangeable latch assembly 12*e*, 12*f*, 12*g*, may be readily constructed to include dummy head 66*d* to facilitate latch actuation.

Figure 8A:
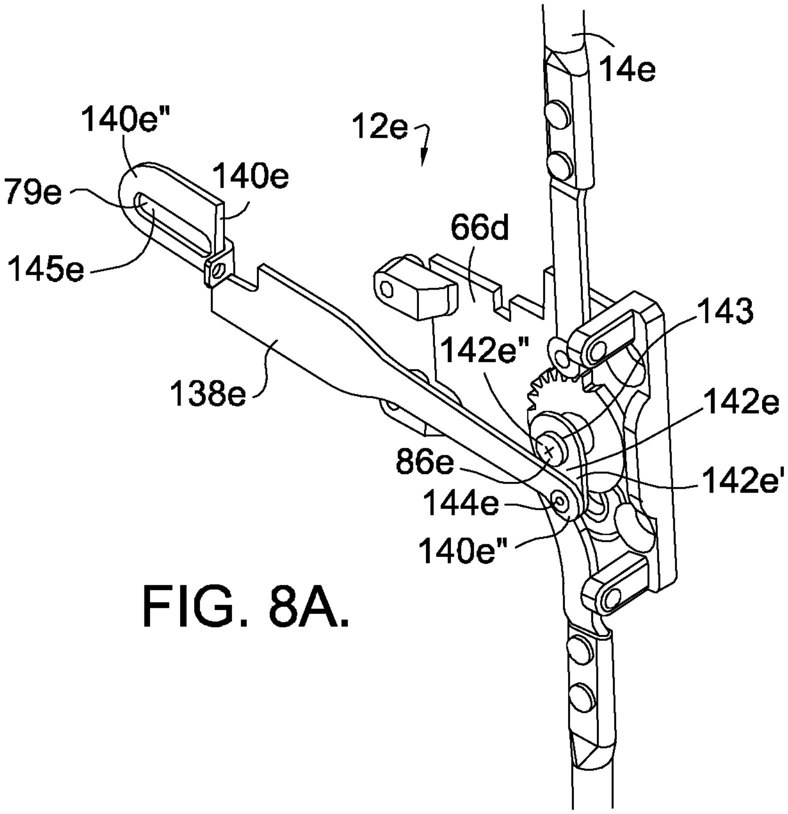
FIGS. 8A and 8B are perspective views of a surface vertical rod style interchangeable latch assembly in accordance with the invention.
Figure 8B:
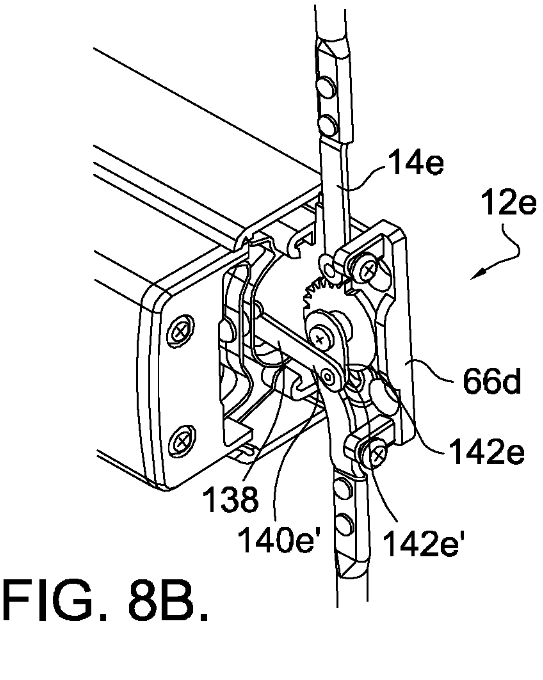

Referring to FIGS. 8A and 8B (SVR style interchangeable latch assembly) 9A-9C (CVR style interchangeable latch assembly) and 10A-10C (mortise interchangeable latch assembly), each respective driven member 138*e*, 138*f* and 138*g* comprising a driven bar 140*e*, 140*f* and 140*g* and pivoting bar 142*e*, 142*f* and 142*g* couples respective latch 14*e*, 14*f* and 14*g* to driving member 46 of the universal actuating assembly (FIG. 3A). Respective first ends 140*e*', 140*f*' and 140*g*' and 142*e*', 142*f*' and 142*g*' of driven bar 140*e*, 140*f* and 140*g* and pivoting bar 142*e*, 142*f* and 142*g* are pivotally connected to one another at pivot 144*e*, 144*f* and 144*g*. At its second end 142*e*", 142*f*" and 142*g*", pivoting bar 142*e*, 142*f* and 142*g* may be operably coupled to a respective spindle 86*e*, 86*f* and 86*g* via a removable fastener 143. Each driven bar 140*e*, 140*f* and 140*g* at its respective second end 140*e*", 140*f*" and 140*g*" may also include a respective slot 145*e*, 145*f* and 145*g* in which connector point 79*e*, 79*f* and 79*g* is located. In this manner, by moving driven bar 140*e*, 140*f* and 140*g* in unlocking direction 32/locking direction 50, respective latch 14*e*, 14*f* and 14*g* is selectively moved to its retracted/extended orientation, as described above. To assure compatibility between universal actuating assembly 11 and any of the interchangeable latch assemblies described in reference to FIG. 8A, 9A or 10A, the x-y-z coordinates as described above measured between: (a) an arbitrary mounting point, commonly shared by the universal actuating assembly and the selected interchangeable latch assembly when interchangeable latch assembly 12*e*, 12 and 12*g* is secured to the universal actuator assembly, and (b) the connector point of the driving member and connector point 79*e*, 79*f* and 79*g* of driven member 138*e*, 138*f* and 138*g* when the latch is in its latched position are generally equal so that the two associated connector points, when the interchangeable latch assembly and the universal actuating assembly are connected, may share the same point in space.

Change of Handedness—Pullman, Star Wheel and Mortise Style Latches

In a Pullman style latch assembly, a handle or key actuator disposed on a door side opposite the push bar may be used to retract its respective latch from its mating strike. Referring specifically to FIGS. 4A, 4D, 4E and 4F, handedness of rotation of the key or handle 110 through drive shaft 102 of Pullman style interchangeable latch assembly which acts upon driven member 76*a* may be reversed by inverting drive lever 104*a* and base plate 106 in an end-over-end fashion. That is, drive lever 104*a* engages projection 108 coupled to driven member 76*a* whereby actuation of key or opposing door handle 110 selectively causes either counter-clockwise rotation (FIG. 4E) or clockwise rotation (FIG. 4F) of drive lever 104*a*. Drive lever 104*a* in turn drives projection 108, and therefore driven member 76*a*, so as to cause latch 14*a* to disengage from strike 20 and allow for opening of door 18.

Figure 5A:
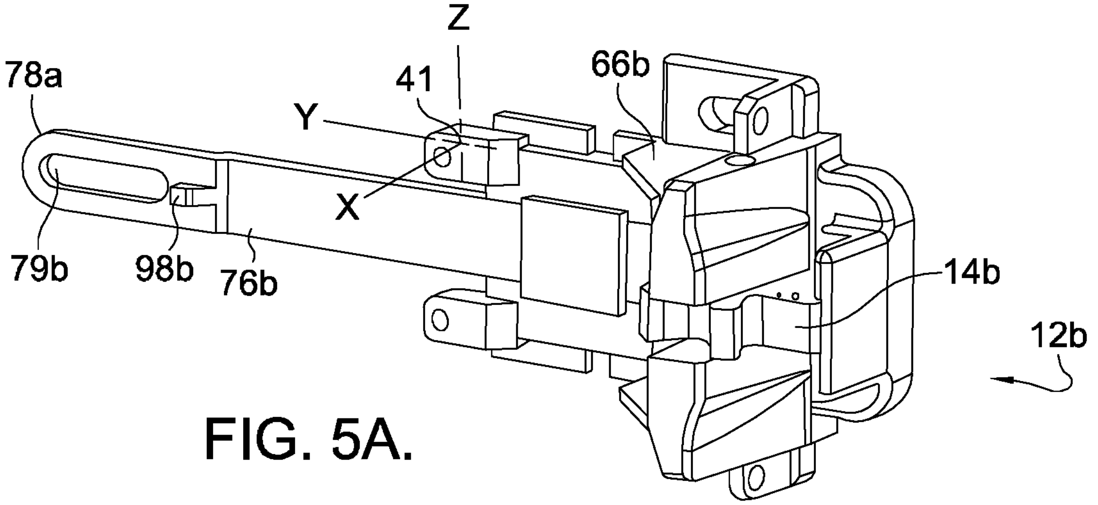
FIG. 5A is a perspective view of a star wheel style interchangeable latch assembly in accordance with the invention.
Figure 5B:
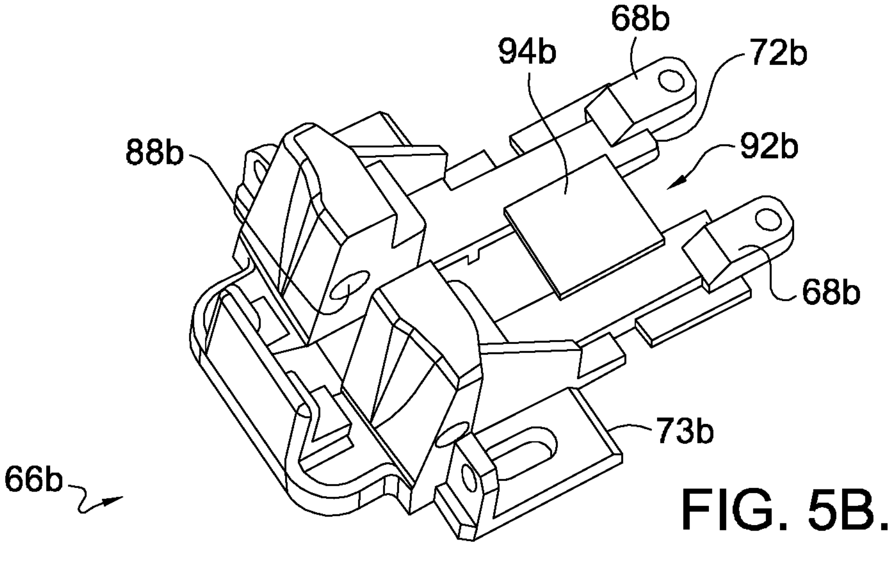
FIG. 5B is a perspective view of a latch head used with the star wheel style latch mechanism shown in FIG. 5A.
Figure 5C:
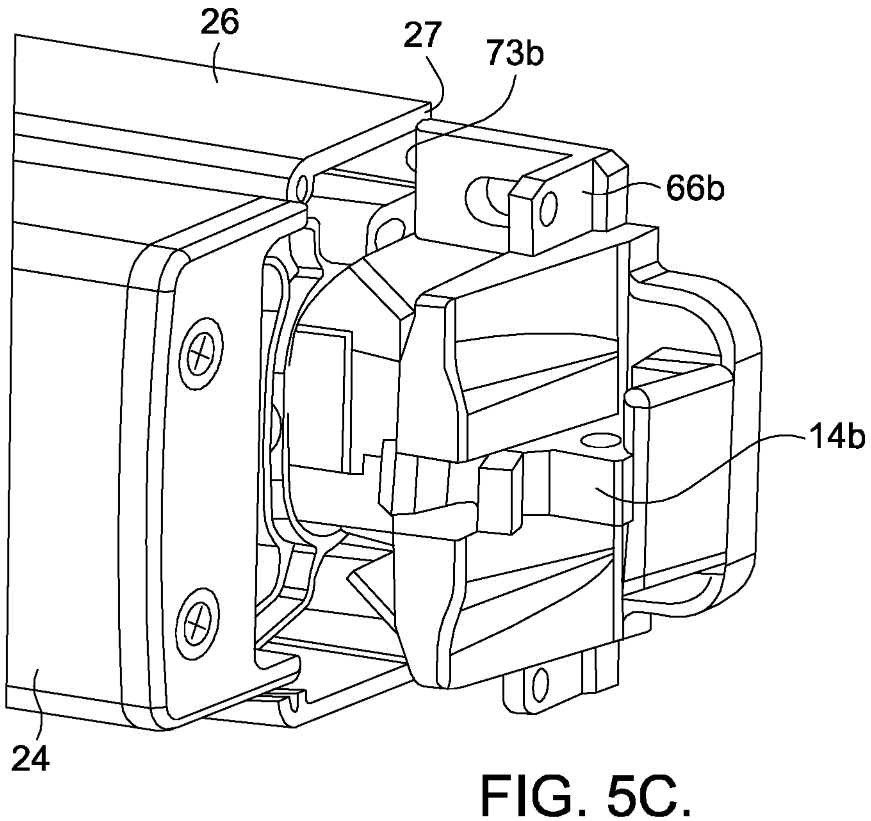
FIG. 5C is a perspective view of the star wheel style interchangeable latch assembly shown in FIG. 5A mounted within the door latch system shown in FIG. 1.
Figure 5D:
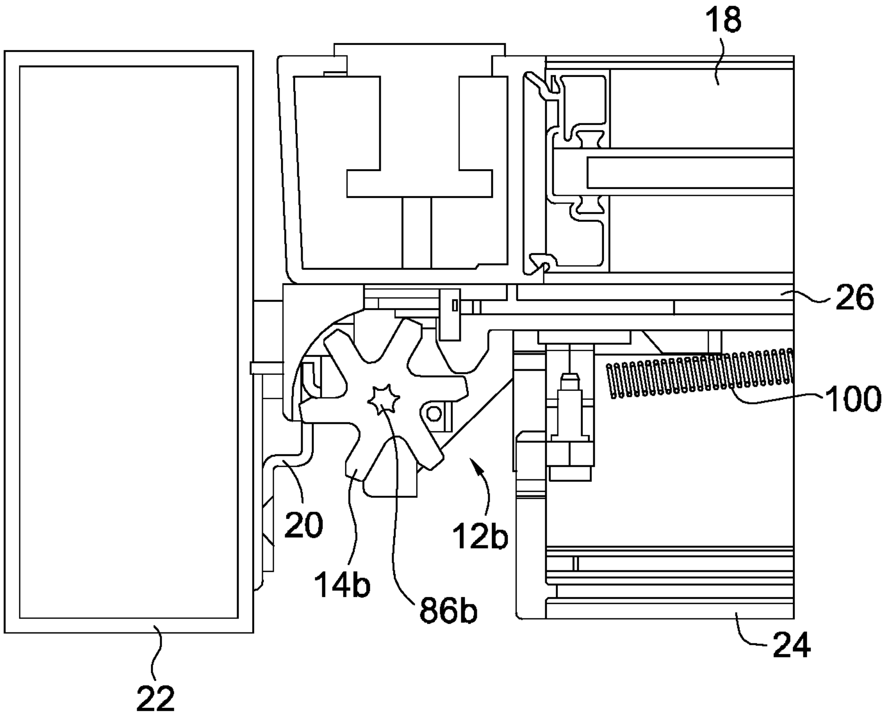
FIG. 5D is a cross section view of the star wheel style interchangeable latch assembly shown in FIG. 5C mounted onto a door and in engagement with a strike.
Figure 5E:
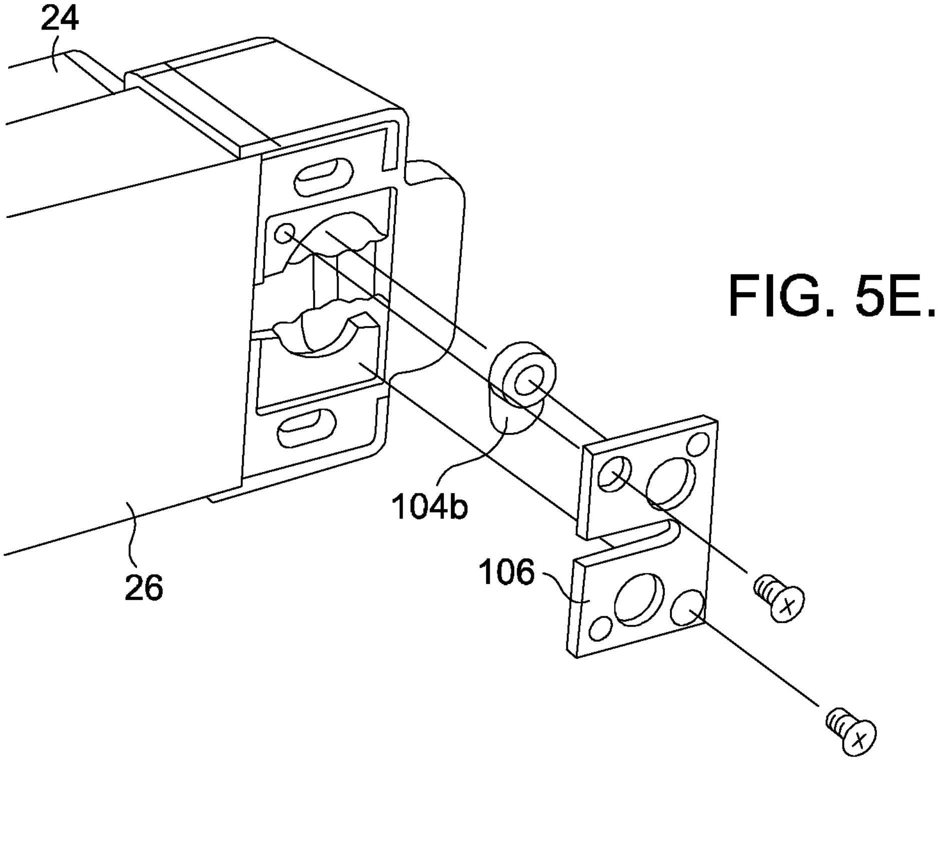
FIG. 5E is an exploded view of an end of a star wheel style door latch system configured for left-handed operation.
Figure 5F:
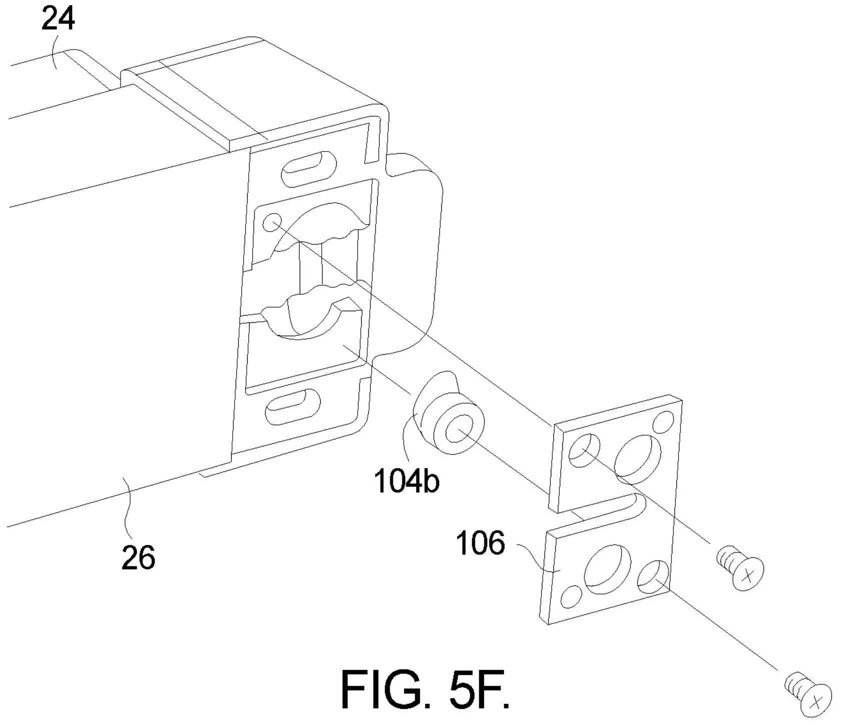
FIG. 5F is an exploded view of an end of a star wheel style door latch system configured for right-handed operation.

As shown in FIGS. 5E and 5F, in a similar fashion, handedness of rotation of a key or handle coupled to a star wheel style interchangeable latch mechanism 12*b* may be reversed by inverting drive lever 104*b* and base plate 106 in an end-over-end fashion.

Figure 11A:
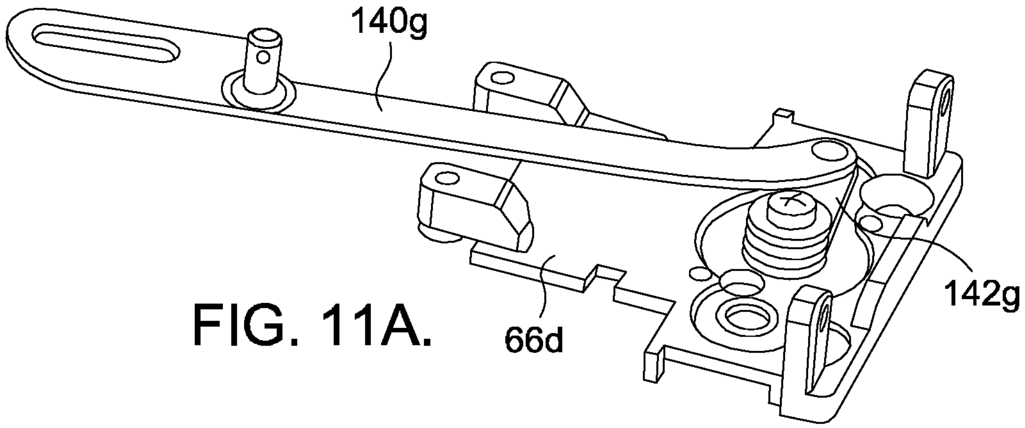
FIG. 11A is a perspective view of a mortise style interchangeable latch assembly wherein the driven bar is oriented for right-handed operation.
Figure 11B:
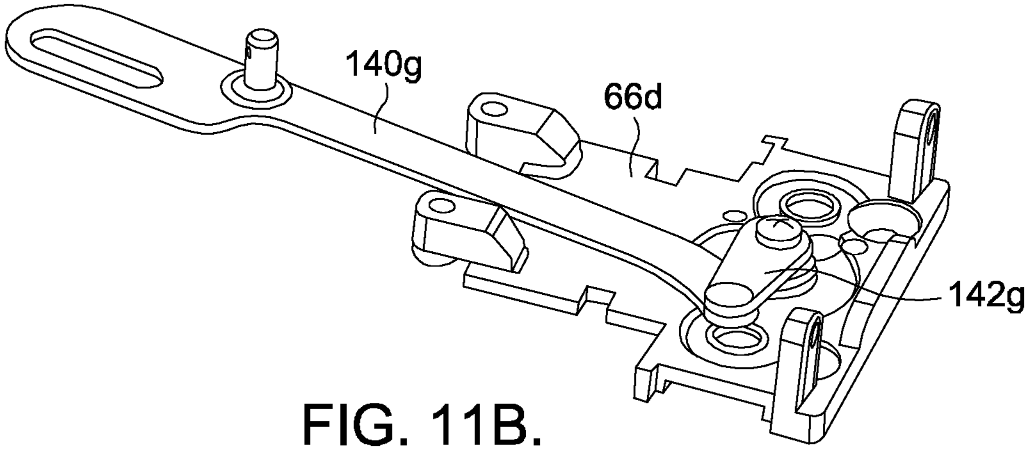
FIG. 11B is a perspective view of a mortise style interchangeable latch assembly wherein the driven bar is oriented for left-handed operation.

As shown in FIGS. 11A and 11B, with respect to the mortise style latch assembly 12*g*, the handedness of operation of a key or handle coupled to a mortise style interchangeable latch mechanism 12*g* may be switched from right-handed to left-handed and vice versa by flipping driven bar 140*g* and pivoting bar 142*g*, as shown.

Shaft Orientation—Concealed Vertical Rod Style Latch Assembly

In some applications, such as when used with a CVR style interchangeable latch assembly as shown in FIG. 9A, it is important to properly index the driven member 138*f* relative to the position of the latch so that, when the push bar is depressed, the latch will properly disengage from its respective strike. Referring to FIGS. 9A and 12A-12C, to facilitate proper indexing of shaft 102 between pivoting bar 142*f* and the position of latch 14*f* in order to achieve proper latch disengagement, shaft 102 may have a generally square-shaped cross section wherein one pair of opposing apexes 148 are truncated to form a flat face 150, and the other opposing apexes 152 are formed without flats. In the shaft design as shown, and in further reference to hub 164 shown in FIG. 12C, a first end 156 of the shaft may be flattened so as to form a blade 158 extending between opposing apexes 152. Blade 158 is configured to be received within a slot 160 defined within a first end 162 of shaft hub 164. A second end 166 of shaft hub 164 is configured to be operably connected to pivoting bar 142*f* and may include a flat edge 167 configured to orient shaft hub 164 to pivoting bar 142*f* in only one orientation such as in one of only two axial positions 180 degrees apart.

A second end 168 of shaft 102, formed as a truncated square as described above is configured to slidably reside within a corresponding, similarly configured slot 170 (FIGS. 12A and 12B) defined within an actuator 169 of latch 14*f*. The orientation of the flat faces 150 within slot 170 dictate the orientation of blade 158. In this manner, blade 158 will properly engage slot 160 only if slot 160 is in a complementary orientation. As a result, flat faces 150 prevent shaft 102 from being inserted 90 degrees from its proper orientation. Thus, door latch system 10 cannot be assembled so that, when the interchangeable latch assembly 12*f* is oriented in a locking position, the latch 14*f* is in an unlocking position.

Figure 12A:
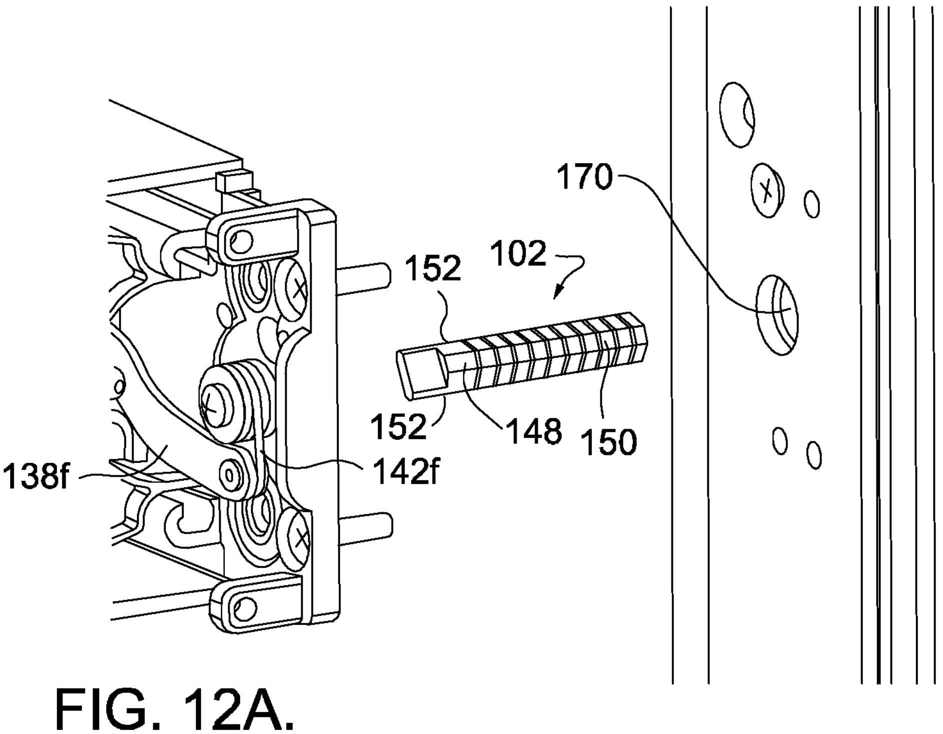
FIG. 12A is a view of a shaft and related parts of an interchangeable latch assembly in accordance with the invention.
Figure 12C:
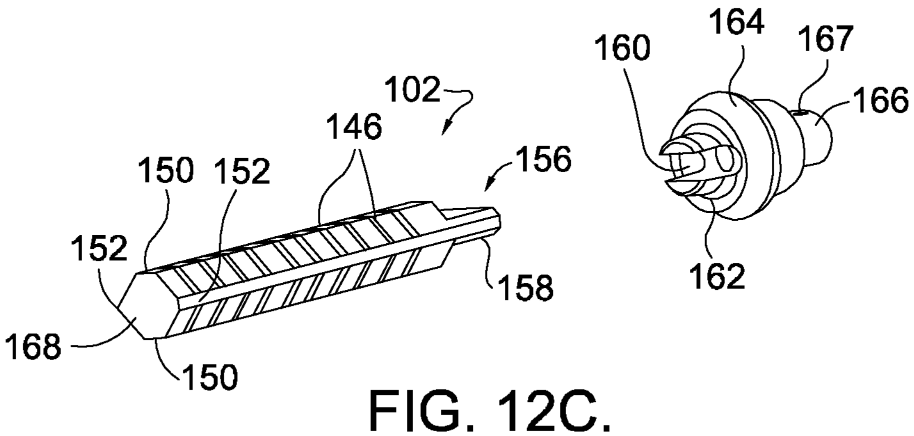
FIG. 12C is a view of a shaft of an interchangeable latch assembly showing how the shaft engages with the shaft hub.
Figure 12B:
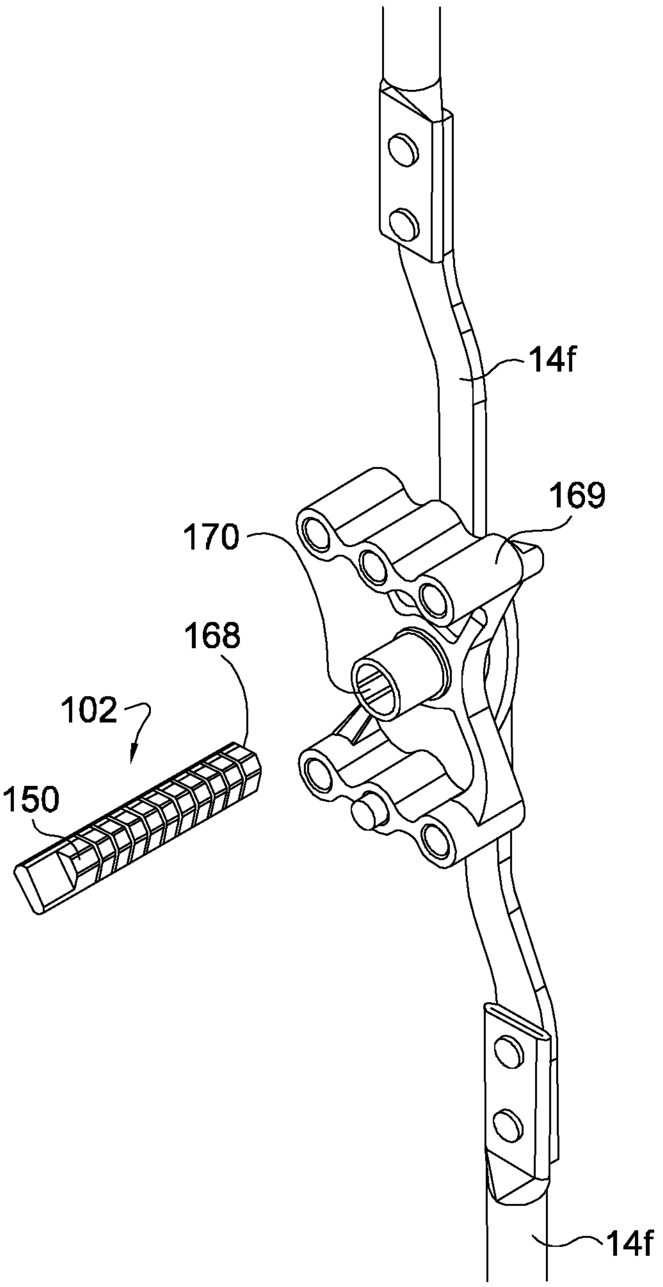
FIG. 12B is a view of a shaft of an interchangeable latch assembly showing how the shaft engages with an actuator.
Figure 12E:
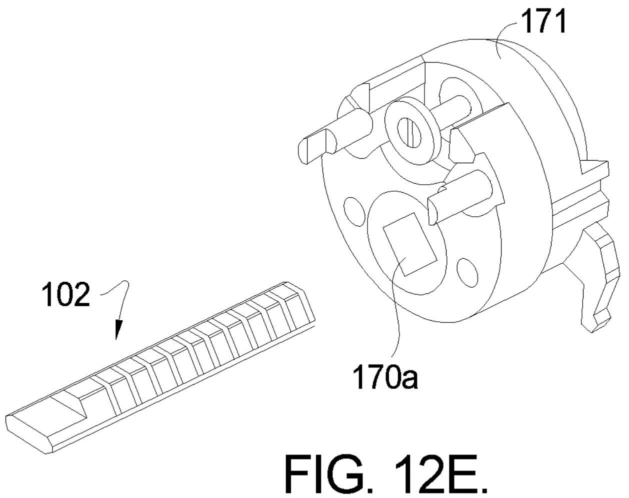
FIG. 12E is a view of a shaft of an interchangeable latch assembly showing how the shaft engages a cam plug of a mortise-style latch.
Figure 12D:
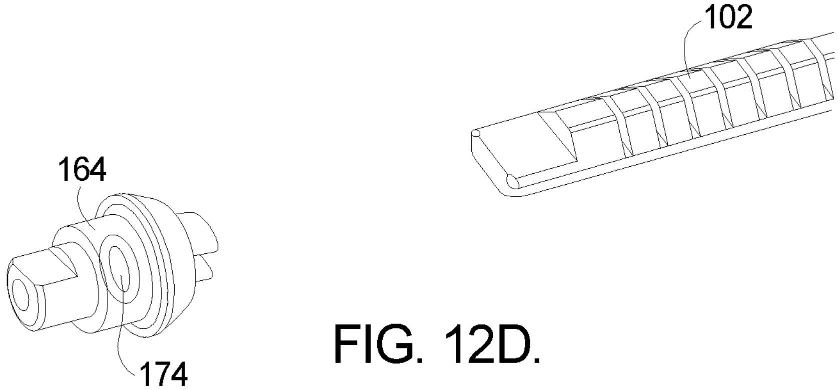
FIG. 12D is a view of a hub and a shaft indicating placement of a magnet in the hub to retain the shaft during assembly.

In accordance with a further aspect, as shown in FIG. 12D, a magnet 174 may be secured within shaft hub 164, wherein magnet 174 attracts and holds shaft 102 during installation so as to facilitate proper alignment between latch head and its associated actuator.

Note that, in connection with a mortise style interchangeable latch assembly as shown in FIG. 12E, shaft 102, having an end formed universally as a truncated square, will nevertheless fit is a square-shaped slot 170*a* of cam plug 171 of a mortise lock since the axial presentation between the latch and latch head is not as critical.

Door Thickness Compensation

As is known in the art, doors may have different thicknesses. As a result, the latch assembly may be located a spaced distance from a latch resident within the body of the door. To accommodate doors of varying thicknesses, shaft 102 as discussed above (see FIGS. 12A & 12C) may be configured to include one or more external annular grooves 146 so as to enable shortening of shaft 102, facilitated by annular grooves 146, so as to accommodate doors of different thickness.

Star Wheel Style Latch Assembly Sequence

Figure 5G:
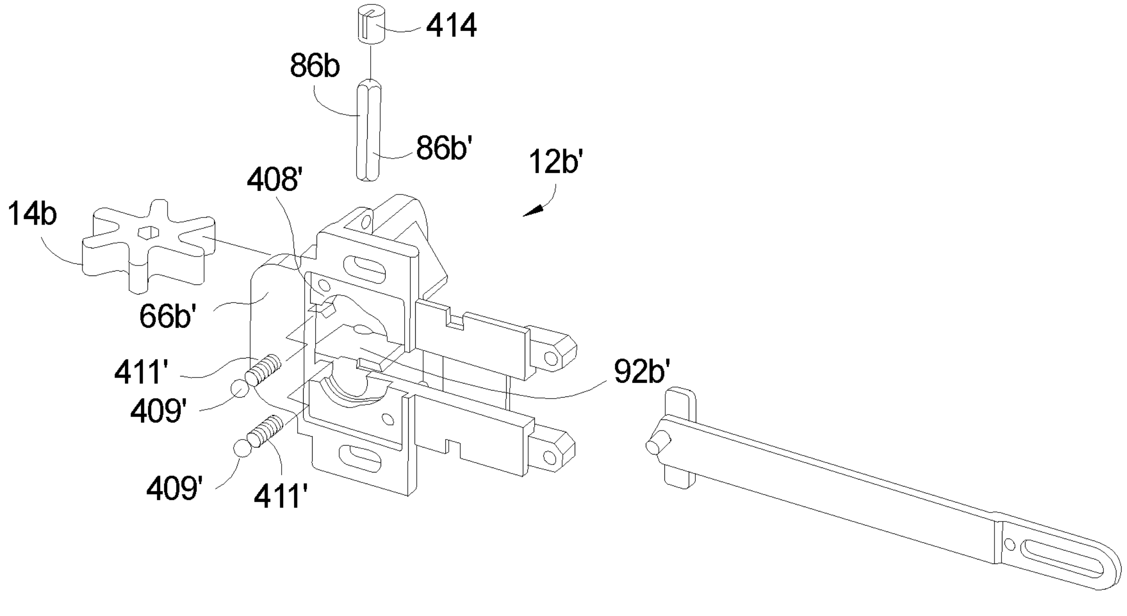
FIG. 5G is an exploded view of a star wheel style interchangeable latch assembly in accordance with the invention.
Figure 5H:
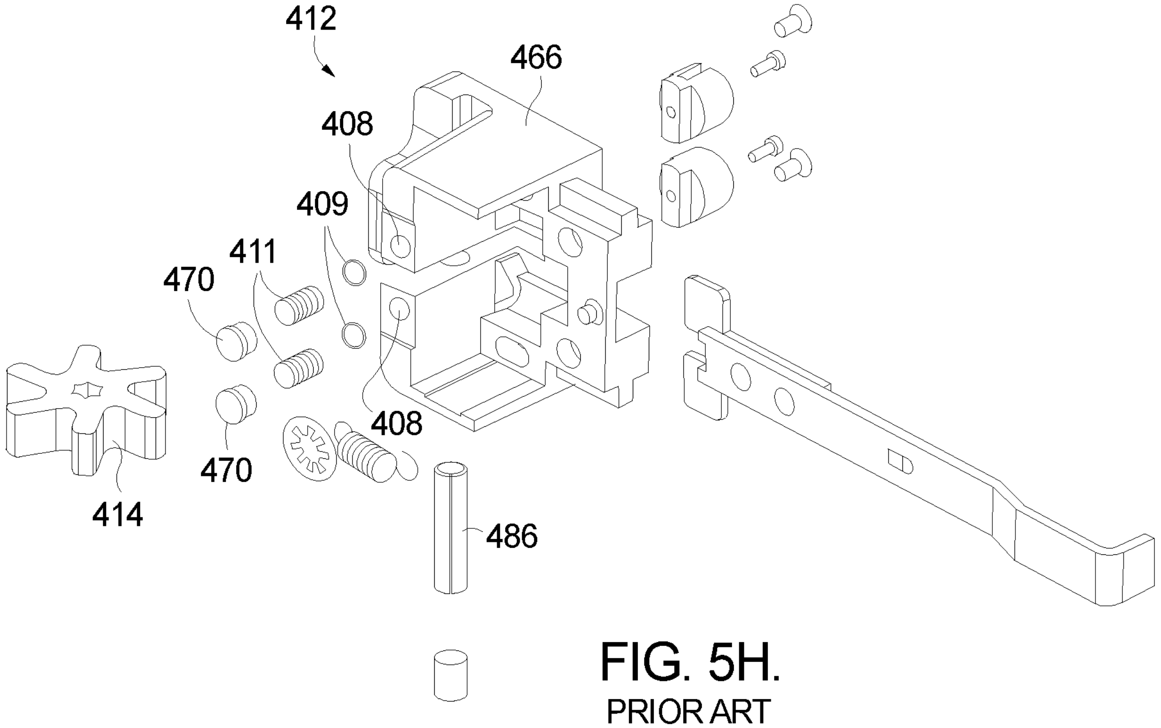
FIG. 5H. PRIOR ART
FIG. 5H is an exploded view of a prior art star wheel latch assembly.

In reference to FIGS. 5G and 5H, additional features of star wheel style latch assembly 12*b* are shown.

Referring first FIG. 5H, a prior art star wheel latch assembly 412 is shown. Star wheel latch 414 is positioned within the latch head 466 and rotatably secured within the housing by spindle 486. Respective balls 409 and then springs 411 are inserted within holes 408 formed in the top side of latch head 466 defined along either side of the star wheel latch such that the balls engage respective fluted sides of spindle 486 to properly position the star wheel for engagement with an associated strike. A respective set screw 470 is then secured to each hole 408 above the spring 411 so as to constrain the spring and ball within the hole and control the magnitude of the force imposed by the spring upon the ball, and thereby onto the flutes of the shaft. While this approach has proven to be effective, there exist a number of drawbacks. For instance, the set screw may unthread over time, lessen the force imposed on the flutes of the shaft and cause subsequent malfunction of the latch mechanism.

Returning to FIG. 5G, in accordance with the invention the order of assembly of star wheel latch assembly 12*b*' is changed. Latch head 66*b*' may be prefabricated to define a pair of blind holes 408' on either side of groove 92*b*' which may be configured to receive star wheel latch 14*b* and spindle 86*b*. The depth of blinds holes 408' is finely controlled during manufacture and machining so as to be consistent from latch head to latch head. With holes 408' so defined, springs 411' and then balls 409' may be loaded within blind holes 408'. Star wheel latch 14*b* is then positioned within groove 92*b*' and secured to latch head 66*b*' by spindle 86*b* such that fluted spindle sides 86*b*' engage with and compress a respective ball 409' and spring 411' within its respective blind hole 408'. Spindle 86*b*' may then be secured in position by push plug 414. Springs 411' are selected such that the bias exerted upon balls 409' and thus fluted spindle sides 86*b*' properly index star wheel latch 14*b* within groove 92*b*'. Thus, proper positioning of the star wheel is maintained. In this manner, set screws are no longer required to secure the balls and springs within the latch head and no field adjustments are needed. Rather, the position and orientation of the star wheel latch 14*b* is established at the factory due to the depth of blind holes 408' and the selected length, produced force and compression of springs 411'.

Fire Rated Star Wheel Style and Pullman Style Latch Assemblies

Figure 5I:
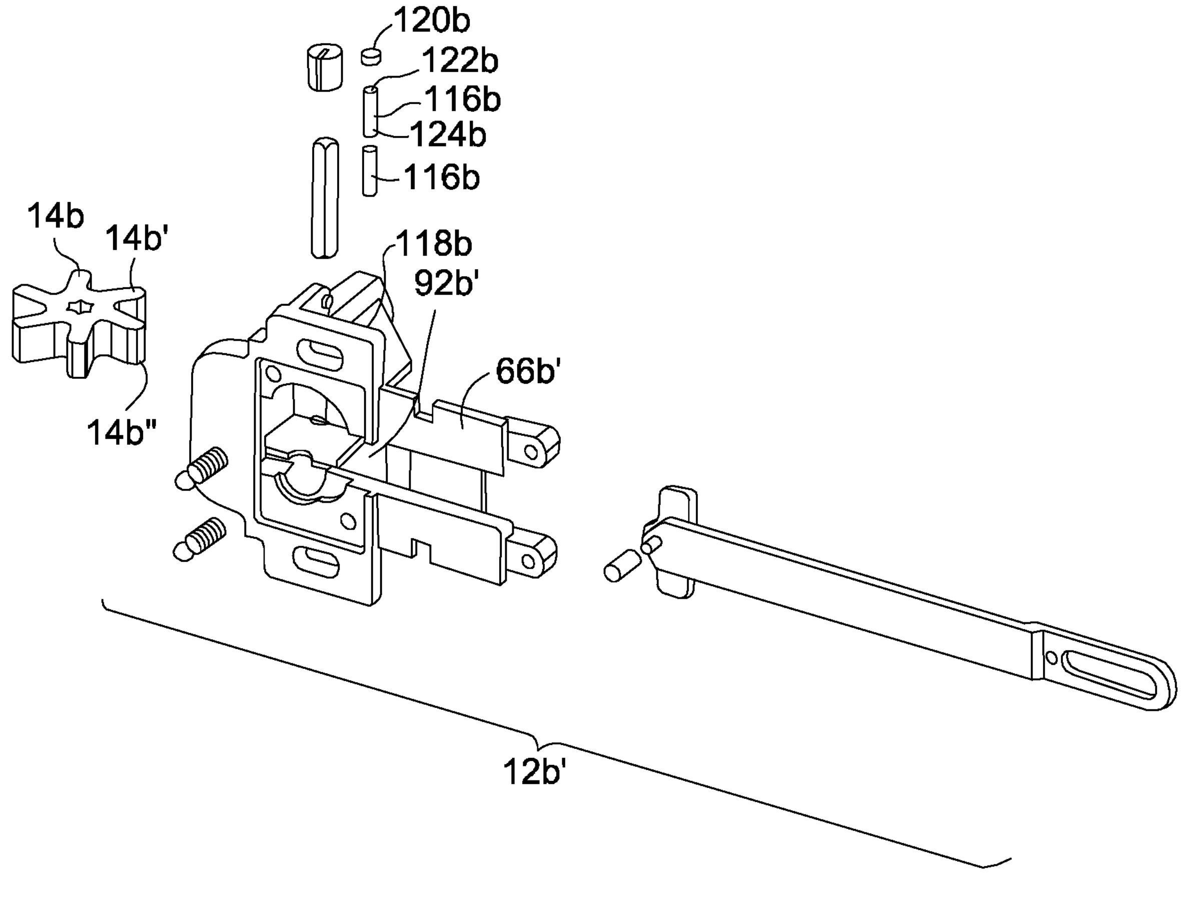
FIG. 5I is an exploded view of a fire rated star wheel style interchangeable latch assembly.

A star wheel style latch assembly, which may be configured as an interchangeable latch assembly, may be fire rated so as to secure latch 14*b* in a locked position, and therefore the door in a closed position, upon occurrence of a fire. To that end, star wheel style latch assembly 12*b*' as shown in FIG. 5I may further include one or more fire roll pins 116*b* configured to reside within holes 118*b* defined within latch head 66*b*' and secured in place via set screw 120*b*. Fire roll pins 116*b* may generally include a metal core portion 122*b* partially or fully encapsulated by a plastic/polymeric sleeve 124*b*. Sleeve 124*b* is dimensioned such that its external diameter causes fire roll pins 116*b* to snuggly reside within hole 118*b* such that during normal operations (no fire conditions), fire roll pins 116*b* are retained in place adjacent to, but not overlapping with, groove 92*b*'. In this manner, star wheel latch 14*b* may freely rotate within groove 92*b*'. However, in the event of a fire condition wherein the heat of such fire is sufficient to melt the plastic/polymer of sleeve 124*b* but not metal core portions 122*b*, metal core portions 122*b* may now translate into groove 92*b*' and selectively engage star wheel latch 14*b* between successive extending arms 14*b*' and 14*b*". Further rotation of star wheel latch 14*b* is prevented as any attempts to move arms 14*b*' or 14*b*" will drive metal core portion 122*b* against latch head 66*b*' thereby arresting star wheel latch 14*b*. As a result, an outwardly extending arm of the star wheel remains secured within the door strike 20 and preventing the door from being opened.

Figure 4G:
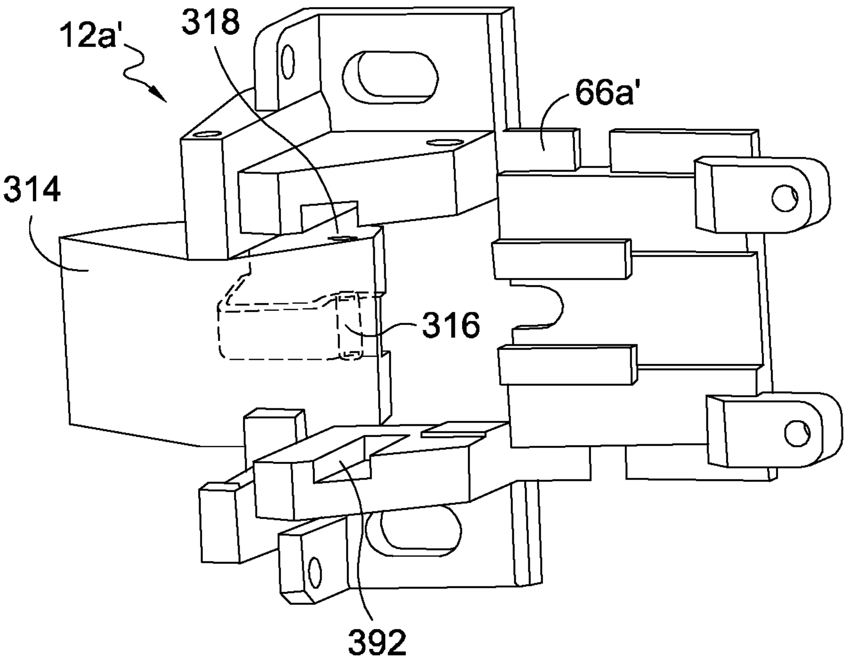
FIG. 4G is a phantom perspective view of a fire rated Pullman style interchangeable latch assembly (without its driven member) similar to that shown in FIG. 4A with the fire roll pin in a non-engaged orientation.
Figure 4H:
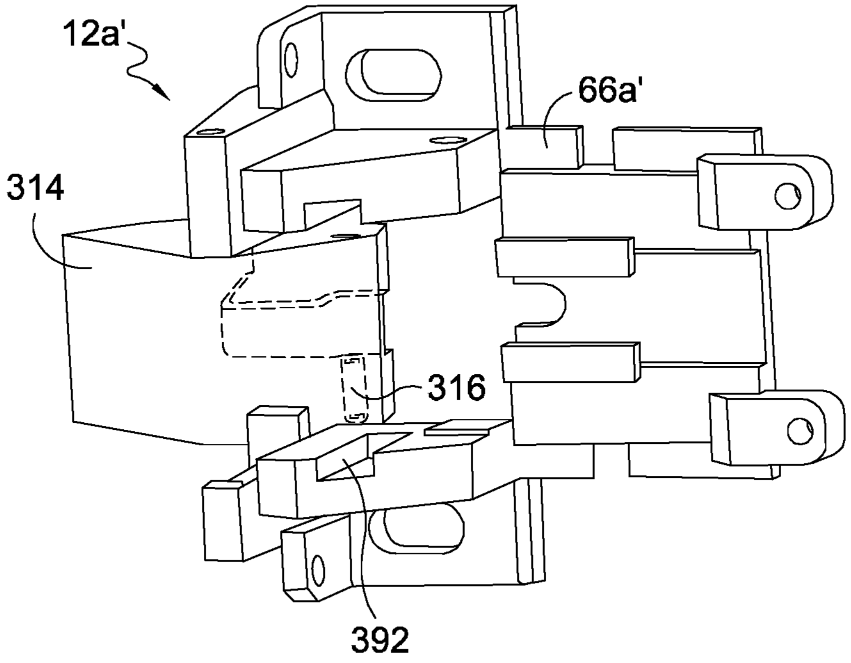
FIG. 4H is a phantom perspective view of the Pullman style interchangeable latch assembly shown in FIG. 4G with the fire roll pin in an engaged orientation such as after being exposed to a fire.

Referring to FIGS. 4G and 4H, a Pullman style latch assembly 12*a*', which may be configured as an interchangeable latch assembly, may be fire rated so as to secure an associated latch 314 in a locked position, and therefore a door in a closed position, upon occurrence of a fire. To that end, the depicted Pullman style interchangeable latch assembly 12*a*' (shown without its driven member) may further include fire roll pin 316 configured to reside within hole 318 defined within latch 314. Fire roll pin 316 generally include a metal core portion partially or fully encapsulated by a plastic/polymeric sleeve, as described in detail in reference to the star wheel type interchangeable patch assembly presented above. The sleeve's external diameter is dimensioned such that it causes fire roll pin 316 to snuggly reside within hole 318 such that during normal operations (no fire conditions), fire roll pin 316 is retained in place within latch 314 as shown in FIG. 4H. When the latch is in its extended, locked position, fire roll pin 316 is adjacent to, but not overlapping with, groove 392 formed in latch head 66*a*' as shown in FIG. 4H. In this manner, latch 314 may freely rotate about its rotational axis. However, in the event of a fire condition wherein the heat of such fire is sufficient to melt the plastic/polymer of sleeve but not metal core portion, the metal core portion of fire roll pin 316 may now translate partially into groove 392 formed in latch head 66*a*', locking latch 314 in its extended, locked position and preventing the door from being opened.

Latch Position Sensor

In the prior art, to sense the state of the latch (latched or unlatched), a position sensor, such as a switch, is used to sense the state of the latch by sensing the position of the push bar. When the push bar is depressed, the switch senses the depressed position of the push bar and, only indirectly, that the latch is in its unlatched state.

In accordance with the invention, a sensor, which may be a switch, senses a position of the driving member 46. Generally stated, where a driving member has a first position allowing a connected latch to be in its latched position and a second position causing the connected latch to be in its unlatched position, the sensor senses when the driving member is in its second position. Thus, since the driving member is more directly connected to the latch, the sensor more precisely senses when the latch is in an unlatched state.

In reference to FIG. 3, and as described above, pivoting leg 42 of one or more actuating members 34 is connected to driving member 46 so that, when the one or more actuating members are acted upon by depressing push bar 24 (FIG. 2), driving member translates in direction 32 to withdraw latch 14 from the strike, thereby placing the latch in its unlatched position.

Figure 13A:
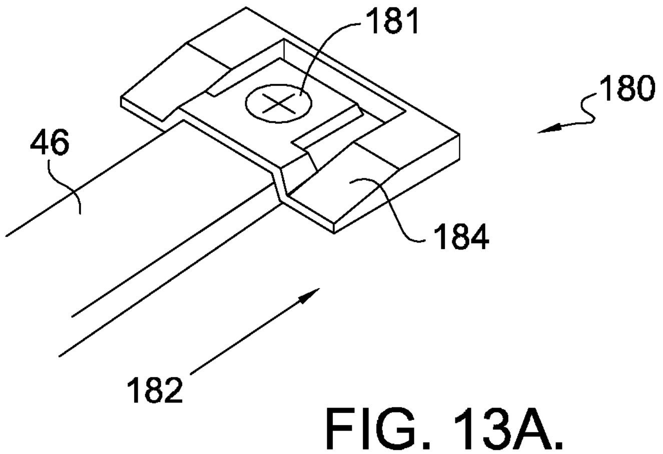
FIG. 13A is a perspective view of a latch position sensor actuator plate attached to the driving member used in conjunction with the door latch system in accordance with the invention.
Figure 13B:
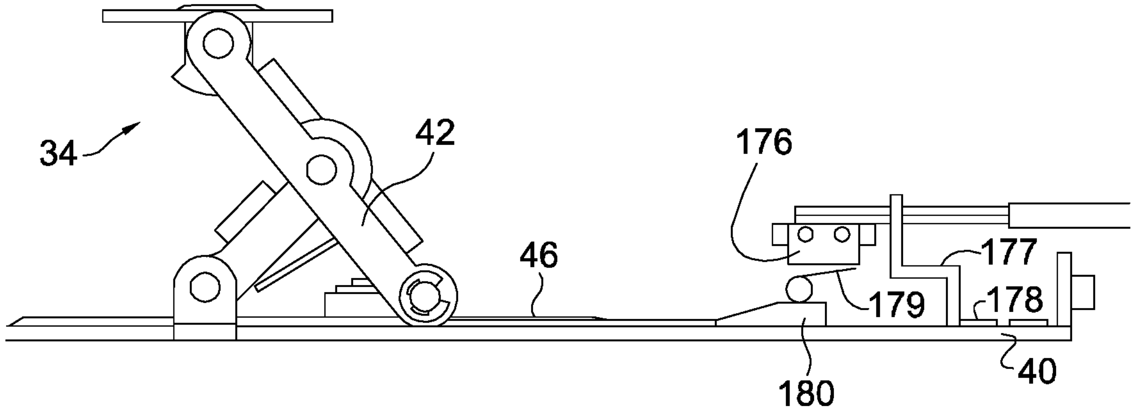
FIGS. 13B and 13C are views of a latch position sensor (latched and unlatched positions) that may be used in conjunction with the door latch system in accordance with the invention.
Figure 13C:
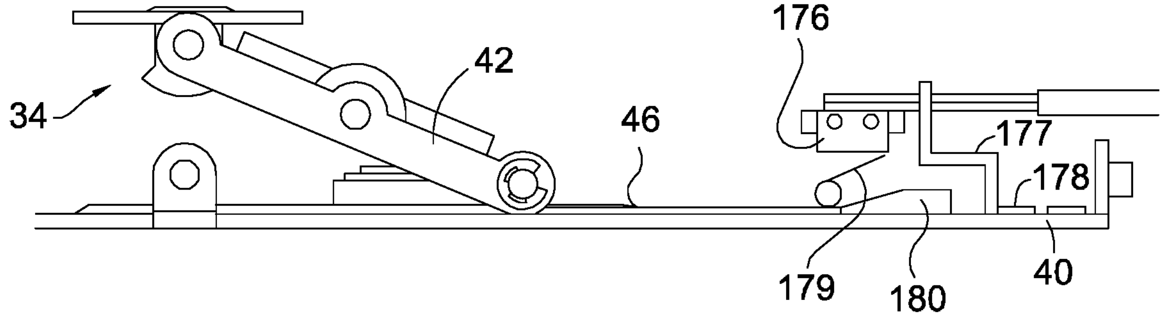

As shown in FIGS. 13A-13C, in accordance with the present invention, the position of driving member 46 of door latch system 10, is monitored using a position sensor 176 readily adaptable to the construct of universal actuating assembly 11 without further modification of its driving member 46 or mounting bracket 40. Sensor 176, shown as a micro-switch, may be mounted to pre-drilled holes in mounting bracket 40 of universal actuating assembly 11 by a bracket 177 and fasteners 178, as shown, and may be hardwired to an external monitor (not shown). Actuator plate 180 may be mounted to a predrilled hole in driving member 46 by fastener 181 so that actuator plate 180 moves with driving member 46, in direction 182, when the driving member translates to place the latch in its unlatched position. Trigger arm 179 of sensor 176 aligns with ramp portion 184 of ramp plate 180 so that trigger arm 179 is deflected upward when the latch is in its latched position (FIG. 13B) and trigger arm 179 is allowed to extend outward (FIG. 13C) when the latch is placed in its unlatched position by driving member 46. In this manner, since driving member 46 is directly connected to the latch through driven member 76 (FIG. 3), the unlocked state of the latch may be more precisely monitored.

Instead of a mechanical switch as shown, position sensor may be configured as a magnetic Hall Effect sensor triggered by movement of a magnet attached to driving member 46.

Position sensor 176 may also be configured to issue an alarm signal should the latch be in an unlatch position for a preselected length of time. This alarm signal may be an audio, visual or audiovisual alarm and/or may include an electronic signal transmitted to a remote security monitoring location. In this manner, building security may be alerted to the potential compromised security condition.

Push Bar Dogging Mechanism

There may come times when a door latching mechanism needs to have the push bar temporarily held in the retracted position thereby holding the latch in an unlatched position and rendering the door unlocked, a situation generally referred to as dogging. To facilitate dogging of an exemplary latching assembly, such as latch system 10, the door latch system may include a dogging mechanism 62 (see FIG. 2).

Figure 14:
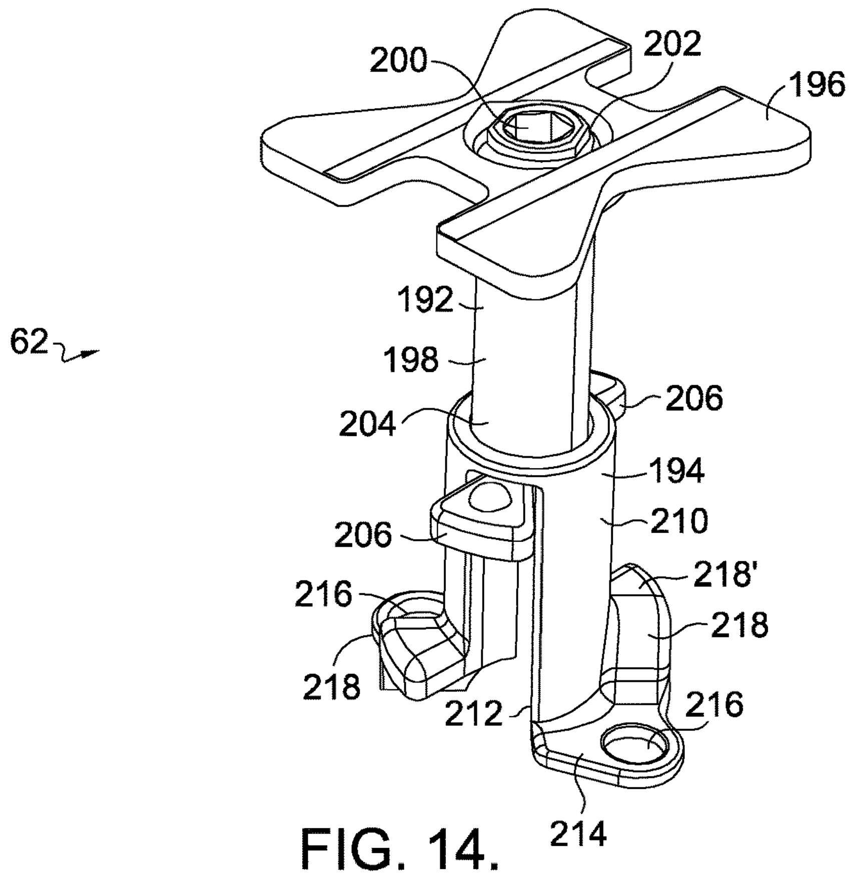
FIG. 14 is a view of an embodiment of a dogging mechanism that may be used in conjunction with the door latch system in accordance with the invention.
Figure 15:
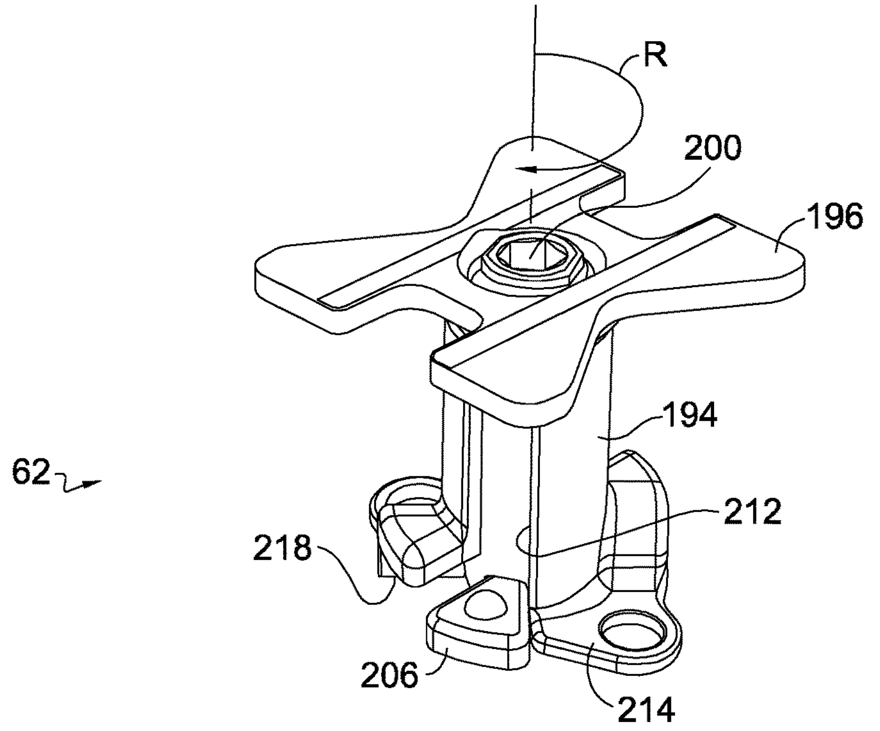
FIG. 15 is the a view of the dogging mechanism shown in FIG. 14 with the push bar depressed.

In accordance with an aspect of the present invention, and in further reference to FIGS. 14 and 15, an exemplary dogging mechanism 62 is readily adaptable to the construct of universal actuating assembly 11. Dogging mechanism 62 may be a two-piece assembly comprised of a bar portion 192 configured to slidably engage within a housing portion 194. Bar portion 192 may include a head flange 196 configured to slide within and be constrained by tracks 54 on push bar 24 (see FIGS. 18A and 18B). Head flange 196 may be mounted onto a post 198 with post 198 having a keyed opening 200 defined in a first end 202 and a second end 204 terminating in a pair of opposing outwardly extending tabs 206. Keyed opening 200 is configured to correspond with an opening 208 in push bar 24 (see FIG. 2). Housing portion 194 includes a generally tubular shaped body 210 defining a pair of grooves 212 configured to slidably receive a respective tab 206 therein. Respective bottom flanges 214 of housing portion 194 define a pair of mounting holes 216 through which housing portion 194 may be fixedly secured to housing 26 via a suitable fastener. Bottom flanges 214 may include a stepped flange portion 218 having one end 218' opening on groove 212.

To dog push bar 24 in the depressed position, with further reference to FIG. 15, push bar 24 is depressed in actuating direction 30 until latch 14 is disengaged from strike 20 as described above. With push bar 24 so depressed, bar portion 192 travels axially within housing portion 194. While maintaining the actuating force upon push bar 24 to keep push bar 24 depressed, a key or wrench (not shown) may be then inserted though push bar opening 208 and within keyed opening 200 and rotated in the rotation direction shown as R, thereby rotating post 198 and tabs 206. Tabs 206 then travel under stepped flange portion 218 on housing portion 194. Removing the actuating force being applied to push bar 24 would normally permit push bar to return to its extended position. However, interference between tabs 206 on bar portion 192 and stepped flange portion 218 on housing portion 194 prevents return travel of push bar 24. As a result, push bar 24 is dogged in the unlatched position. To alleviate the dogged condition, an operator would need to reverse rotate the key or wrench such that tabs 206 again correspond with grooves 212 whereby reverse travel of post 198 and tabs 206 is again permitted. It should be noted that housing 26 may include predrilled holes to correspond with mounting holes 216 such that keyed opening 200 aligns with hole 208 within push bar 24.

Noise Dampening Features

Figure 16:
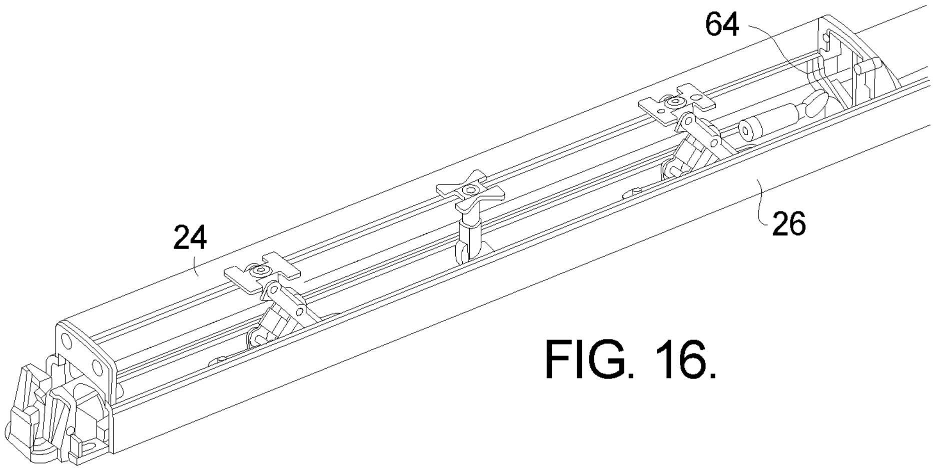
FIGS. 16, 17A and 17B are views of noise reduction devices that may be mounted within the door latch system shown in FIG. 1.
Figure 17B:
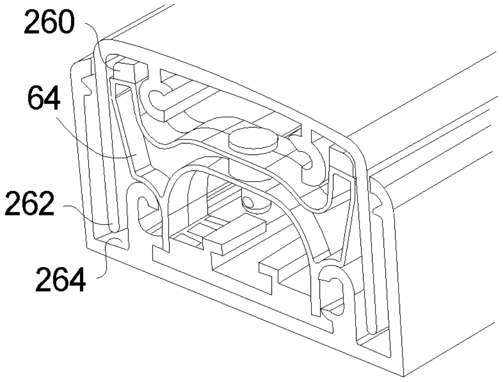

In accordance with a further aspect of the present invention, door latch system 10 may include one or more of a number of noise dampening elements designed to enable quieter operation. As shown in FIGS. 16, 17A and 17B, housing 26 may be configured to include one or more bar guides 64. As shown in FIG. 17A, bar guides 64 may be placed proximate each end of push bar 24. Each bar guide 64 may be constructed of a durable plastic configured to reduce vibration and rattling as push bar 24 travels in directions 32/50 as described above. Bar guide 64 may further include shock absorbing material 260, such as Viton or other suitable elastomer/composite, which is configured to engage push bar 24 upon full depression of push bar in actuating direction 30. In this manner, the metal portions of push bar 24 do not strike metal portions of housing 26, including bottom edges 262 of push bar contacting back panel 264 of housing 26.

Figure 18B:
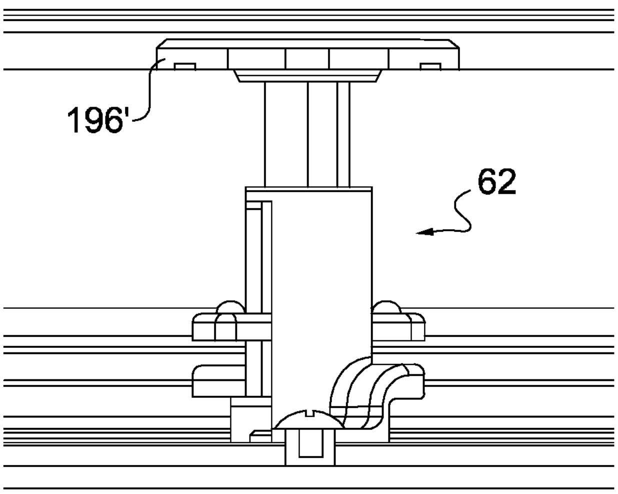
FIGS. 18A and 18B are views of a noise reduction head flange of a dogging mechanism.
Figure 18A:
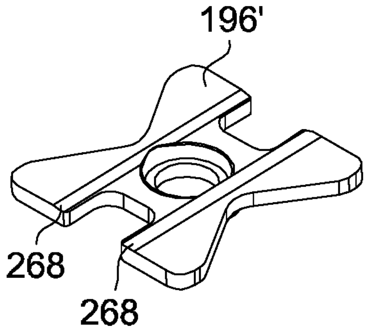

With reference to FIGS. 18A and 18B, for those systems employing dogging mechanism 62, head flange 196 may be fabricated from a non-metal material as head flange 196'. Head flange 196' may be fabricated from materials such as, but not limited to, glass-filled nylon, and more particularly Nylon 6/6 with 30% glass-fill. Head flange 196' may minimize or eliminate vibration and other rattling between dogging mechanism 62 and push bar 24. Head flange 196' may also include one or more crush ribs 268 configured to press against the inner surface 56 (FIG. 17A) of push bar 24 in a light interference fit to minimize clearance between the thickness of head flange 196' and the width of tracks 54 (FIG. 17A). Crush ribs 268 may be made of any suitable material, such as Viton or other fluoroelastomer.

Figure 19A:
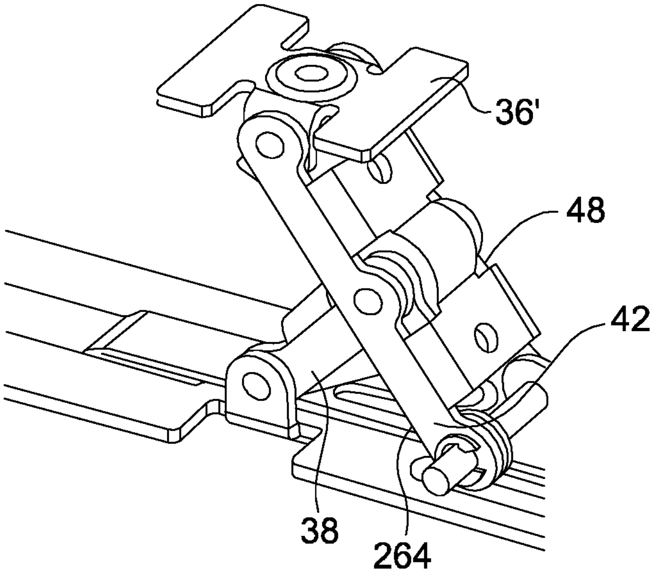
FIG. 19A is a perspective view of an actuating member equipped with a noise reduction bar mount and actuating member spacer.
Figure 19B:
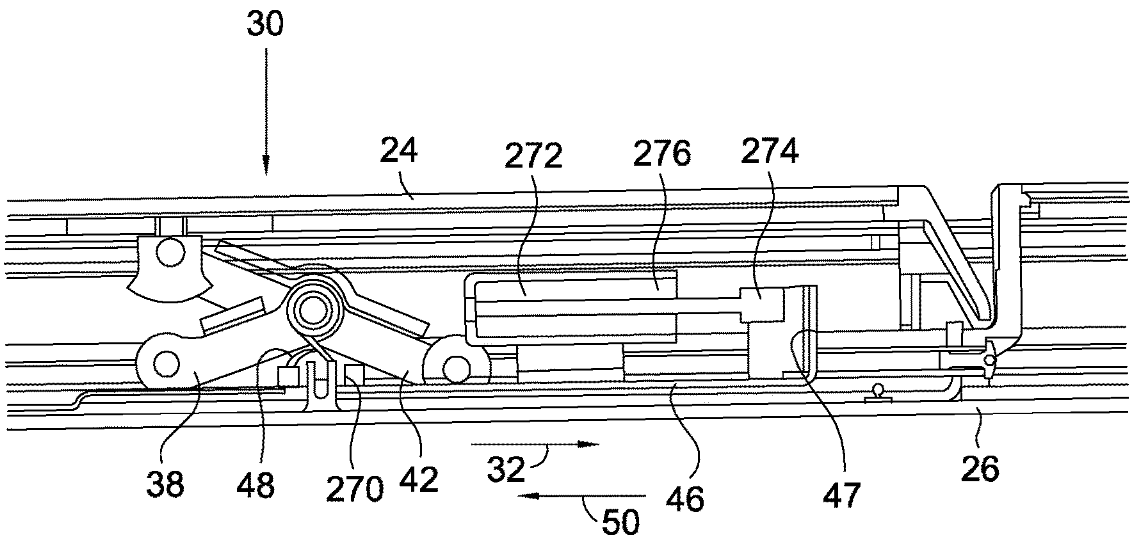
FIG. 19B is a side cross section view of the actuating member shown in FIG. 19A with the push bar is in its depressed position.
Figure 19C:
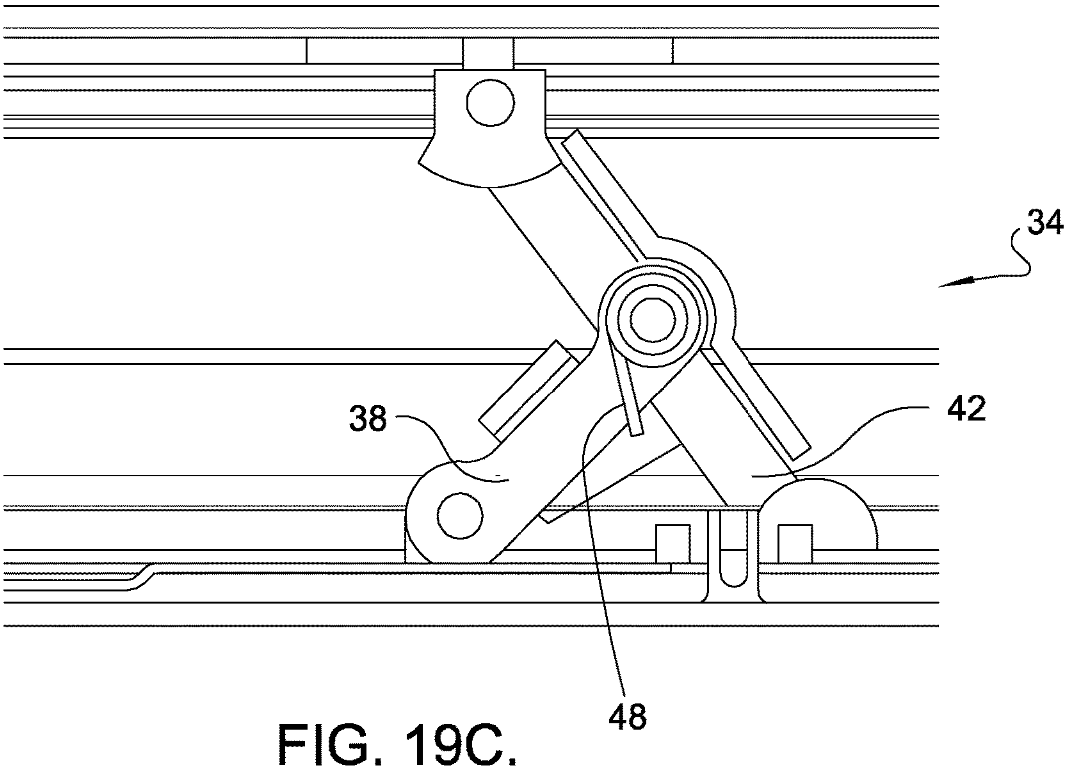
FIG. 19C is a side cross section view of the actuating member shown in FIG. 19A with the push bar in the extended position.

Referring to FIGS. 19A-19C, additional noise reduction features may include non-metallic bar mounts 36' fabricated from materials such as, but not limited to, glass-filled nylon, and more particularly Nylon 6/6 with 30% glass-fill, and actuating member spacers 170.

Actuating member spacers 270 are mounted beneath fixed leg 38 and pivoting leg 42 of actuating member 34. Spacers 270 are proportioned such that pivoting leg 42 lightly impacts spacer 270 upon full depression of push bar in actuating direction 30 as shown in FIG. 19B. In this manner, the metal components of actuating member 34 do not impact any mounting structures on housing 26 or housing 26 itself.

Additionally, snubber 272 may be mounted within housing 26 proximate upwardly extending portion 47 of driving member 46 so as to selectively control return of push bar 24 from its depressed orientation to its extended orientation opposite actuating direction 30. As shown generally in FIG. 19B, depressing push bar 24 in actuating direction 30 pivots pivoting leg 42 as described above and driving member 46 (and upwardly extending portion 47) travel in unlocking direction 32. As a result, plunger 274 is biased outward from snubber housing 276 to its extended position. When push bar 24 returns to its extended orientation (FIG. 19C), which may be influenced by a restorative force exerted by biasing member 48, upwardly extending portion 47 engages plunger 274 of snubber 272. Plunger 270 absorbs some of the restoration force of biasing member 48 and slows the return travel of push bar 24 thereby enabling push bar to gently return to its extended orientation without forcefully (and noisily) impacting housing 26.

When the snubber is used in conjunction with the position sensor described above, the sensor (such as a switch) may be mounted to the snubber.

Integrated Alarm System

Figure 20A:
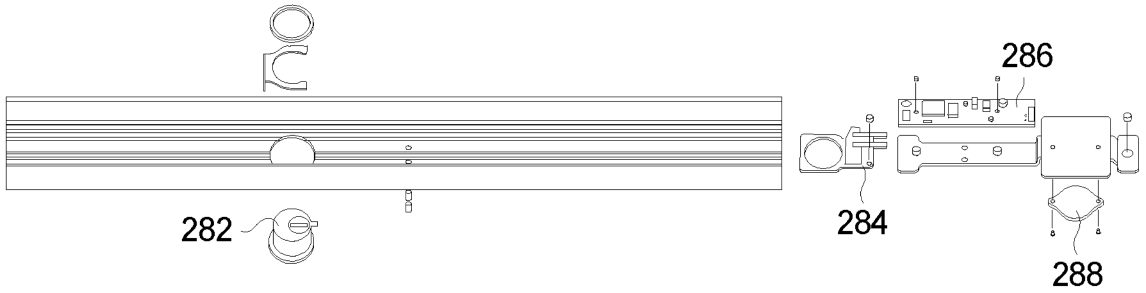
FIGS. 20A through 20C are views of an embodiment of an alarm assembly that may be mounted within the door latch system shown in FIG. 1.
Figure 20B:
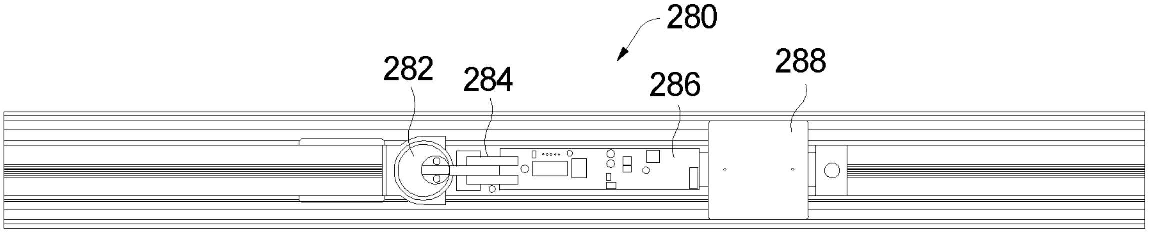
Figure 20C:
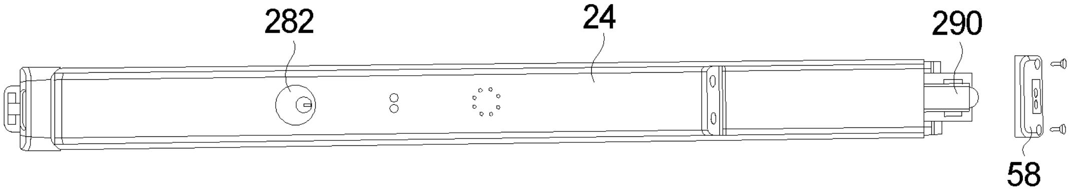

FIGS. 20A-20C show an alarm assembly 280 configured to be mounted to tracks 54 on inner surface 56 of push bar 24 (see FIG. 17A). Alarm assembly 280 includes a keyed cylinder 282 coupled to a switch lever assembly 284 mounted to a circuit board 286. A speaker 288, such as for example a piezo speaker, is connected to circuit board 286 and is configured to issue an alarm should unauthorized use of push bar 24 be detected. Alarm assembly 280 may be hard wired or may be battery powered. A battery pack 290 can be conveniently accessed and changed via removal of push bar end 58. Speaker 288 is configured to be mounted a spaced distance from inner surface 56 so as to defeat an attempt to damage the speaker with a foreign object inserted through openings in the push bar in order to disable the alarm.

Wire Clips

Figure 21A:
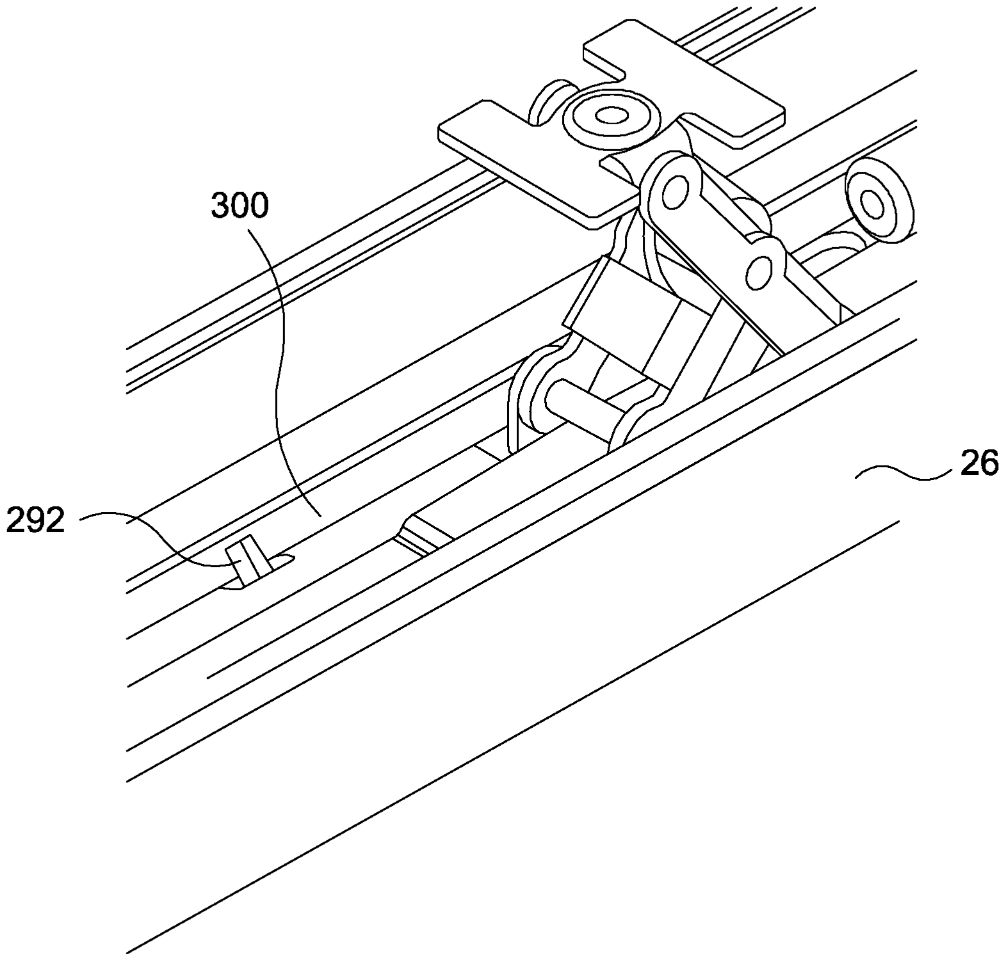
FIGS. 21A through 21C are views of a wire clip that may be mounted within the door latch system shown in FIG. 1.
Figure 21B:
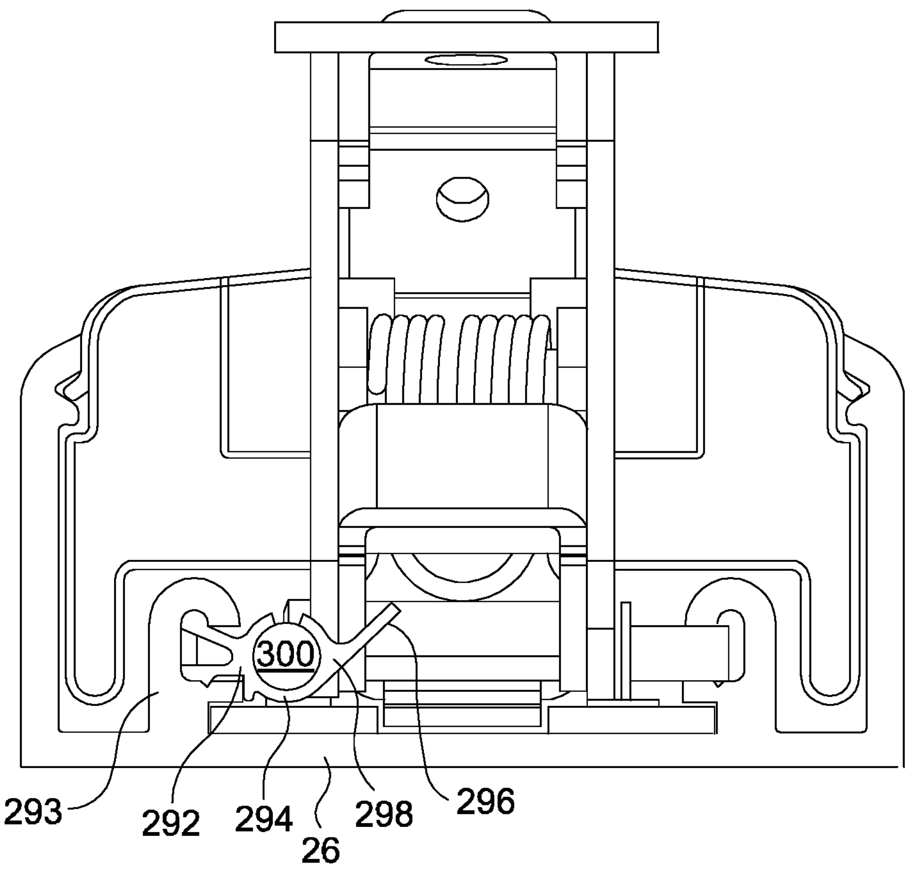
Figure 21C:
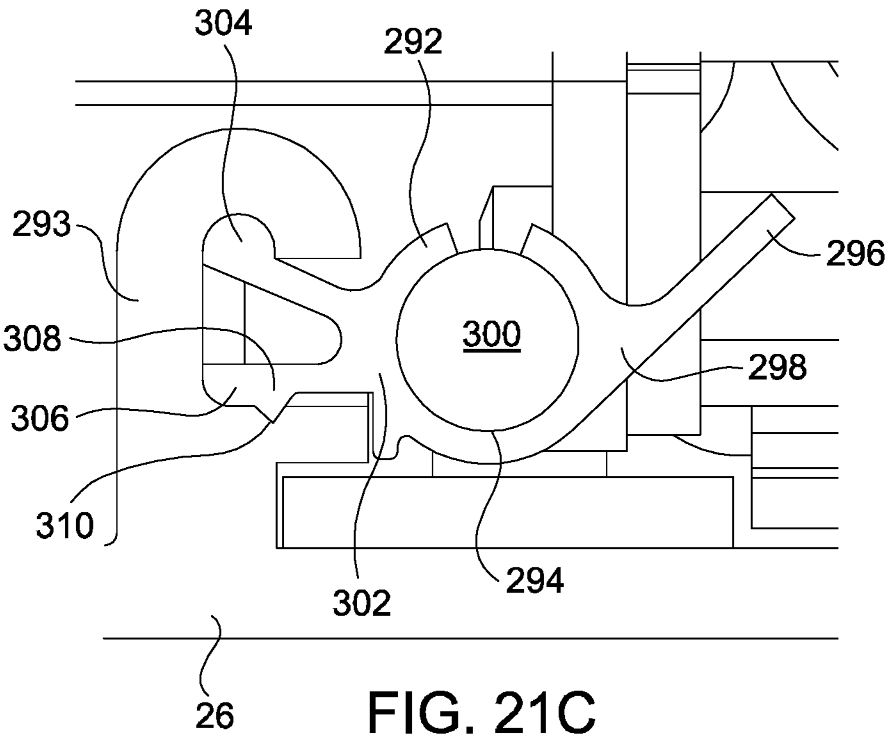

Turning now to FIGS. 21A through 21C, a wire clip 292 is shown releasably attached to existing track 293 formed on housing 26. Clip 292 includes a generally C-shaped center region 294 with an outwardly extending tab 296 extending from a first side 298. Tab 296 may aid in inserting or removing clip 292 from track 293. Center region 294 is configured to receive an electrical wire 300 used within door latch system 10. In accordance with one aspect of the present invention, center region 294 is proportioned to snuggly receive 0.22 inch diameter wire. Opposing second side 302 may include a pair of generally V-shaped upper and lower extensions 304 and 306 configured to be snuggly received within track 293. Lower extension 306 may include a boss 308 configured to releasably lock within groove 310 on track 252. In this manner, one or more clips 292 may be provided so as to securely channel wiring within housing 26 so prevent any tangling or damaging of the wiring upon repeated depression and extension of the push bar.

Method of Converting the Latch Head of a Door Latch System

In accordance with the invention, and in reference to FIGS. 1-3A, a method of swapping a first interchangeable latch assembly with a second interchangeable latch assembly without requiring extensive modification of the actuating assembly is as follows: (1) providing door latch system 10 having a universal actuating assembly and a first interchangeable latch assembly, wherein the x-y-z coordinates measured between an arbitrary mounting point 41, commonly shared by the universal actuating assembly and the first interchangeable latch assembly when the first interchangeable latch assembly 12 is secured to universal actuating assembly 11, and connector point 82 of driving member 46 and connector point 79 of driven member 76 when the latch is in its latched position are generally equal; (2) disconnecting and removing the first interchangeable latch assembly; (3) selecting a second interchangeable latch assembly wherein the x-y-z coordinates measured between an arbitrary mounting point 41, commonly shared by the first universal actuating assembly and the selected second interchangeable latch assembly when the second interchangeable latch assembly 12 is secured to universal actuating assembly 11, and connector point 82 of driving member 46 and connector point 79 of driven member 76 are generally equal; and (4) connecting the second interchangeable latch assembly to the universal actuating assembly.

In a further aspect of the invention, following step (1), further steps may include: removing end cap 28 and removing push bar 18. Following step (4), further steps may include: reconnecting the push bar and reinstalling end cap 28.

It is understood that the swap can be made to replace one interchangeable latch assembly with an identically configured interchangeable latch assembly or to replace one interchangeable latch assembly with an interchangeable latch assembly of a different configuration as generally shown in FIGS. 4A-10C. Also, the swap can be made while door latch system 10 is attached to a door or while not attached to a door.

It is also understood that a similar process may be used to swap out a first universal actuating assembly for a second universal actuation assembly wherein the second universal actuating assembly may be the same as the first universal actuating assembly, or not.

Accordingly, a method of swapping a first universal actuating assembly with a second universal actuating assembly without requiring extensive modification of the actuating assembly is as follows: (1) providing door latch system 10 having a first universal actuating assembly and an interchangeable latch assembly, wherein the x-y-z coordinates measured between an arbitrary mounting point 41, commonly shared by the first universal actuating assembly and the interchangeable latch assembly when the first interchangeable latch assembly 12 is secured to universal actuating assembly 11, and connector point 82 of driving member 46 and connector point 79 of driven member 76 when the latch is in its latched position are generally equal; (2) disconnecting and removing the first universal actuating assembly from the interchangeable latch assembly; (3) selecting a second universal actuating assembly wherein the x-y-z coordinates measured between an arbitrary mounting point 41, commonly shared by the selected second universal actuating assembly and the interchangeable latch assembly when the interchangeable latch assembly 12 is secured to the second universal actuating assembly 11, and connector point 82 of driving member 46 and connector point 79 of driven member 76 when the latch is in its latched position are generally equal; and (4) connecting the interchangeable latch assembly to the second universal actuating assembly.

In a further aspect of the invention, following step (1), further steps may include: removing end cap 28 and removing push bar 18. Following step (4), further steps may include: reconnecting the push bar and reinstalling end cap 28.

In the descriptions above, the commonly shared arbitrary mounting point 41 is shown to be a point on lobe 68, 68*a*, 68*b* that touches a point on mounting bracket 40 when the interchangeable latch assembly is secured to the universal actuating assembly. However, it is understood that the "commonly share arbitrary mounting point" in accordance with the invention may be any common point shared by the interchangeable latch assembly and the associated universal actuating assembly when the two are assembled together.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A door latch system having a first latch movable between a latched position and an unlatched position for releasably securing a door in a door frame, wherein said first latch is a first type, the door latch system comprising:

a) a universal actuating assembly including a mounting bracket and a driving member movably connected to said mounting bracket and movable a distance between a driving member latched position and a driving member unlatched position to cause said first latch to move from said latched position to said unlatched position, wherein said mounting bracket includes a first mounting point and said driving member includes a driving member connector point, wherein a first distance is defined between said driving member connector point and said first mounting point when said driving member is in said driving member latched position; and b) a first interchangeable latch assembly including a first head, said first latch and a first driven member operatively connected to said first latch and movable between a first driven member latched position and a first driven member unlatched position by the driving member, wherein said first interchangeable latch assembly is configured to be removably coupled to said universal actuating assembly, wherein said first interchangeable latch assembly includes a second mounting point and said first driven member includes a first driven member connector point, wherein a second distance is defined between said first driven member connector point and said second mounting point when the first driven member is in said first driven member latched position, wherein said first mounting point of said mounting bracket is commonly shared with said second mounting point of said first interchangeable latch assembly when said first interchangeable latch assembly is coupled to said universal actuating assembly, wherein said first distance is generally equal to said second distance when said first interchangeable latch assembly is connected to said universal actuating assembly and said first latch is in said latched position, wherein a second interchangeable latch assembly is configured for being swapped with said first interchangeable latch assembly, wherein said second interchangeable latch assembly includes a second head, a second latch wherein said second latch is a second type that is not the first type of said first latch, and a second driven member movable between a second driven member latched position and a second driven member unlatched position by the driving member, wherein said second interchangeable latch assembly includes a third mounting point and a second driven member connector point, wherein a third distance is defined between said second driven member connector point and said third mounting point when said second driven member is in said second driven member latched position, wherein said first mounting point of said mounting bracket is commonly shared with said third mounting point of said second interchangeable latch assembly when said second interchangeable latch assembly is coupled to said universal actuating assembly, wherein said first distance is generally equal to said third distance when said second interchangeable latch assembly is connected to said universal actuating assembly and said second latch is in said latched position, and wherein said second distance is generally equal to said third distance when said first and second interchangeable latch assemblies are not connected to said universal actuating assembly.

2. The door latch assembly in accordance with claim 1 wherein said first, second and third distances are defined by three dimensional coordinates.

3. The door latch assembly in accordance with claim 1 wherein said second distance is defined between said first driven member connector point and said second mounting point when said first driven member is not in said first driven member latched position, and wherein said third distance is defined between said second driven member connector point and said third mounting point when said second driven member is not in said second driven member latched position.

4. A method of swapping a first interchangeable latch assembly with a second interchangeable latch assembly of a door latch assembly, wherein said first interchangeable latch assembly includes a first latch of a first type, and wherein said second interchangeable latch assembly includes a second latch of a second type that is not the first type of said first latch, the method comprising the steps of:

(1) providing said door latch assembly having a universal actuating assembly and said first interchangeable latch assembly, wherein first x-y-z coordinates are provided between an arbitrary mounting point commonly shared by the universal actuating assembly and the first interchangeable latch assembly when the first interchangeable latch assembly is secured to said universal actuating assembly, and a connector point of a driving member of the universal actuating assembly and a connector point of a first driven member of said first interchangeable latch assembly when a first latch of said first interchangeable latch assembly is in a first latched position;

(2) disconnecting and removing said first interchangeable latch assembly from said universal actuating assembly;

(3) selecting said second interchangeable latch assembly, wherein second x-y-z coordinates are provided between said arbitrary mounting point commonly shared by the universal actuating assembly and said second interchangeable latch assembly when said second interchangeable latch assembly is secured to said universal actuating assembly, and said connector point of said driving member and a connector point of a second driven member of said selected second interchangeable latch assembly, wherein said first and second x-y-z coordinates are generally equal; and (4) connecting said second interchangeable latch assembly to said universal actuating assembly.

5. The method in accordance with claim 4, wherein prior to step (2) further steps comprise:

(1) removing an end cap of said universal actuating assembly; and (2) removing a push bar of said universal actuating assembly.

6. The method in accordance with claim 5, wherein following step (4), further steps comprise:

(1) reconnecting the push bar to said universal actuating assembly; and (2) reinstalling said end cap to said universal actuating assembly.

7. A door latch system for releasably securing a door to a door frame, said door latch system comprising:

a) a first latch assembly comprising a first latch and a first driven member, wherein said first latch is a first type, wherein said first driven member is operatively connected to said first latch so that movement of said first driven member moves said first latch between a first latched position to secure said door to said door frame and a first unlatched position to release said door from said door frame, wherein said first latch assembly includes a first mounting point and said first driven member includes a first driven member connector point, wherein a first distance is defined between said first driven member connector point and said first mounting point when said first driven member is in said first latched position;

b) an actuating assembly comprising a mounting bracket and a driving member, wherein said driving member is movable between a first driving member position and a second driving member position, wherein said driving member is configured to be operatively connected to said first driven member so that when said driving member is in said first driving member position said first latch is in said first latched position to secure said door to the door frame, and when said driving member is in said second driving member position said first latch is in said first unlatched position to release said door from said door frame, wherein said mounting bracket includes a second mounting point and said driving member includes a driving member connector point, wherein a second distance is defined between said driving member connector point and said second mounting point when said driving member is in said first driving member position, wherein said second mounting point of said mounting bracket is commonly shared with said first mounting point of said first latch assembly when said first latch assembly is coupled to said actuating assembly, and wherein said first distance is equal to said second distance when said first latch assembly is connected to said actuating assembly and said latch is in said latched position;

wherein said door latch system is configured so that said first latch assembly may be swapped with a second latch assembly, wherein said second latch assembly comprises a second latch and a second driven member, wherein said second latch is a second type that is not the first type of said first latch, wherein said second driven member is operatively connected to said second latch, wherein when said driving member of said actuating assembly is connected to said second driven member, movement of said second driven member by said driving member moves said second latch between a second latched position to secure said door to said door frame and a second unlatched position to release said door from said door frame, wherein said second latch assembly includes a third mounting point and a second driven member connector point, wherein a third distance is defined between said second driven member connector point and said third mounting point when said second driven member is in said second latched position, wherein said second mounting point of said mounting bracket is commonly shared with said third mounting point of said second latch assembly when said second latch assembly is coupled to said actuating assembly, and wherein said second distance is equal to said third distance when said second latch assembly is connected to said actuating assembly and said latch is in said first latched position, and wherein said first distance is equal to said third distance when said first and second latch assemblies are not connected to said actuating assembly and said latch is in said first latched position.

* * * * *